United States Patent
Kuramoto et al.

(10) Patent No.: US 8,746,394 B2
(45) Date of Patent: Jun. 10, 2014

(54) WORKING VEHICLE

(75) Inventors: Takashi Kuramoto, Sakai (JP);
Kensuke Okabe, Sakai (JP)

(73) Assignee: Kubota Corporation, Osaka (JP)

( * ) Notice: Subject to any disclaimer, the term of this patent is extended or adjusted under 35 U.S.C. 154(b) by 114 days.

(21) Appl. No.: 13/421,101

(22) Filed: Mar. 15, 2012

(65) Prior Publication Data

US 2013/0048407 A1    Feb. 28, 2013

(30) Foreign Application Priority Data

Aug. 22, 2011  (JP) ................................ 2011-180916
Aug. 22, 2011  (JP) ................................ 2011-180918
Aug. 23, 2011  (JP) ................................ 2011-181898

(51) Int. Cl.
*B60K 17/00* (2006.01)
*B60K 13/04* (2006.01)

(52) U.S. Cl.
USPC ........................................ 180/292; 180/296

(58) Field of Classification Search
USPC ........... 180/291, 292, 293, 296; 280/781, 785
See application file for complete search history.

(56) References Cited

U.S. PATENT DOCUMENTS

| | | | | |
|---|---|---|---|---|
| 5,337,629 | A * | 8/1994 | Kita ................................ | 477/52 |
| 5,915,415 | A * | 6/1999 | Huang ............................ | 137/551 |
| 5,915,495 | A * | 6/1999 | Kerlin et al. ................... | 180/291 |
| 6,170,597 | B1 * | 1/2001 | Fukuda .......................... | 180/292 |
| 7,089,824 | B2 * | 8/2006 | Nakatani et al. .............. | 74/730.1 |
| 7,287,619 | B2 * | 10/2007 | Tanaka et al. ................. | 180/291 |
| 2004/0206567 | A1 * | 10/2004 | Kato et al. ..................... | 180/291 |
| 2008/0060867 | A1 * | 3/2008 | Oda et al. ....................... | 180/291 |
| 2009/0091101 | A1 * | 4/2009 | Leonard et al. ............... | 280/638 |
| 2009/0239706 | A1 | 9/2009 | Ishida et al. | |
| 2010/0206272 | A1 | 8/2010 | Ishida et al. | |
| 2011/0259012 | A1 | 10/2011 | Tada et al. | |

FOREIGN PATENT DOCUMENTS

| | | |
|---|---|---|
| JP | 2007-83824 | 4/2007 |
| JP | 2009-67144 | 4/2009 |
| JP | 2010-190152 | 9/2010 |

OTHER PUBLICATIONS

U.S. Appl. No. 13/241,981 to Kazuo Koike et al., filed Sep. 23, 2011.
U.S. Appl. No. 13/242,013 to Kazuo Koike et al., filed Sep. 23, 2011.
U.S. Appl. No. 13/242,079 to Kazuo Koike et al., filed Sep. 23, 2011.
U.S. Appl. No. 13/418,860 to Takashi Kuramoto et al., filed Mar. 13, 2012.

(Continued)

*Primary Examiner* — Frank Vanaman
(74) *Attorney, Agent, or Firm* — Greenblum & Bernstein, P.L.C.

(57) ABSTRACT

A continuously variable transmission as a speed change unit is inclined such that an upper portion of the transmission is displaced more than a lower portion of the transmission toward one side in a lateral direction of a vehicle body. Thereby, a space on the other side of the upper portion of the transmission in a vehicle body frame is enlarged, and a muffler is arranged in the space. The vehicle body frame may an inverted trapezoid shape, when viewed in a longitudinal direction, with an imaginary line connecting upper ends of left and right vertical frames as an upper base and an imaginary line connecting lower ends of the vertical frames as a lower base. Inside the trapezoid, a longitudinally oriented long muffler is arranged in a vicinity of one of the upper left and right corners of the trapezoid.

16 Claims, 37 Drawing Sheets

(56) References Cited

OTHER PUBLICATIONS

U.S. Appl. No. 13/418,889 to Takashi Fujii, filed Mar. 13, 2012.
U.S. Appl. No. 13/418,846 to Takashi Kuramoto, filed Mar. 13, 2012.
U.S. Appl. No. 13/423,551 to David Spitz et al., filed Mar. 19, 2012.
U.S. Appl. No. 13/423,581 to Maxwell Reichard et al., filed Mar. 19, 2012.
U.S. Appl. No. 13/425,795 to Robert Walden, filed Mar. 21, 2012.

* cited by examiner

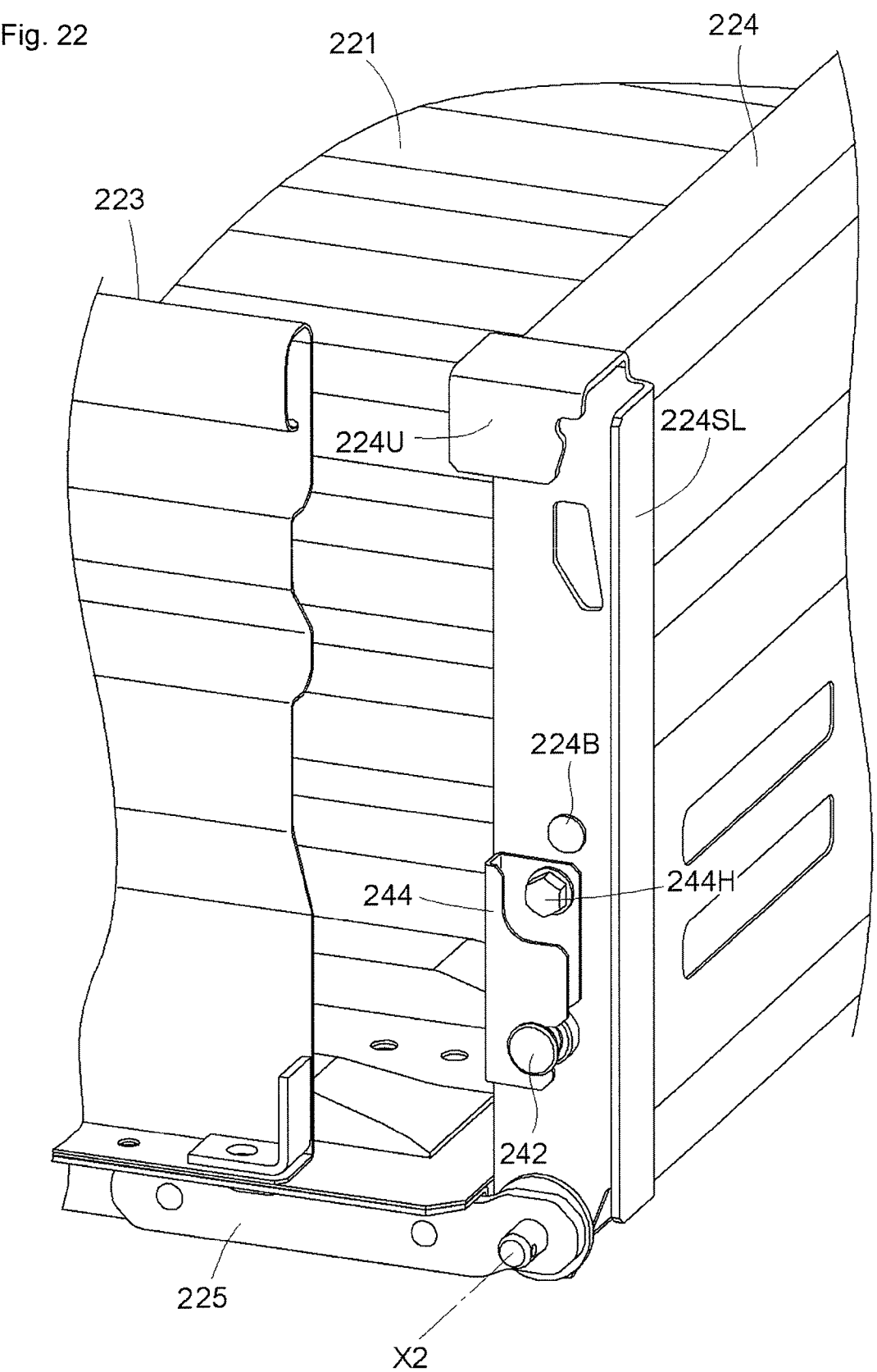

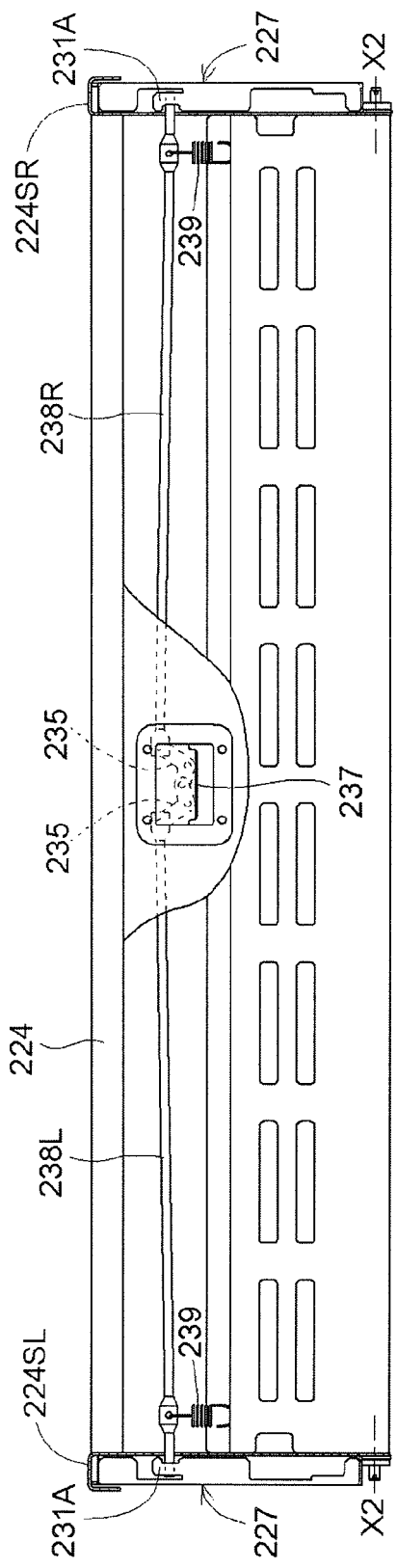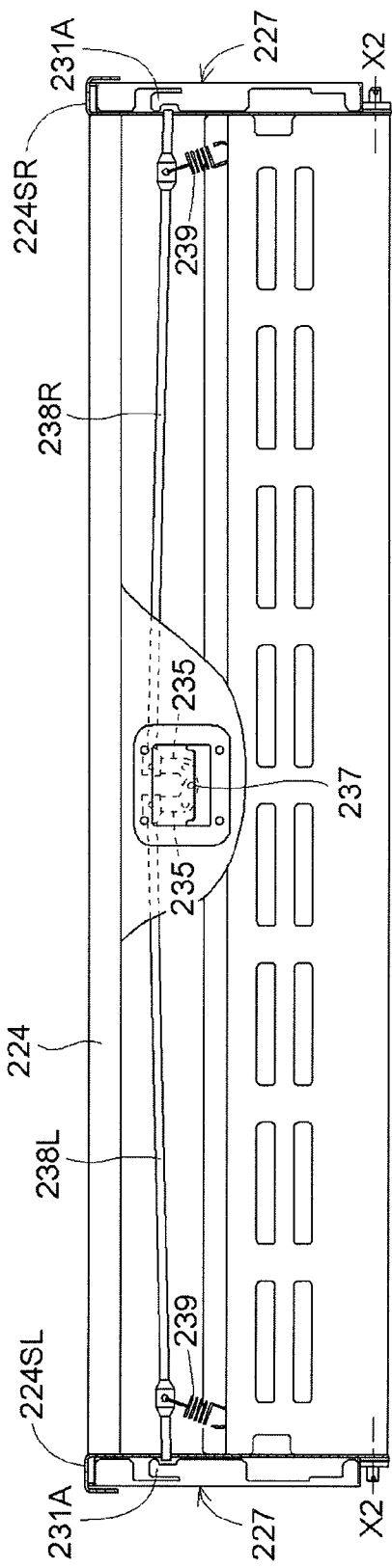

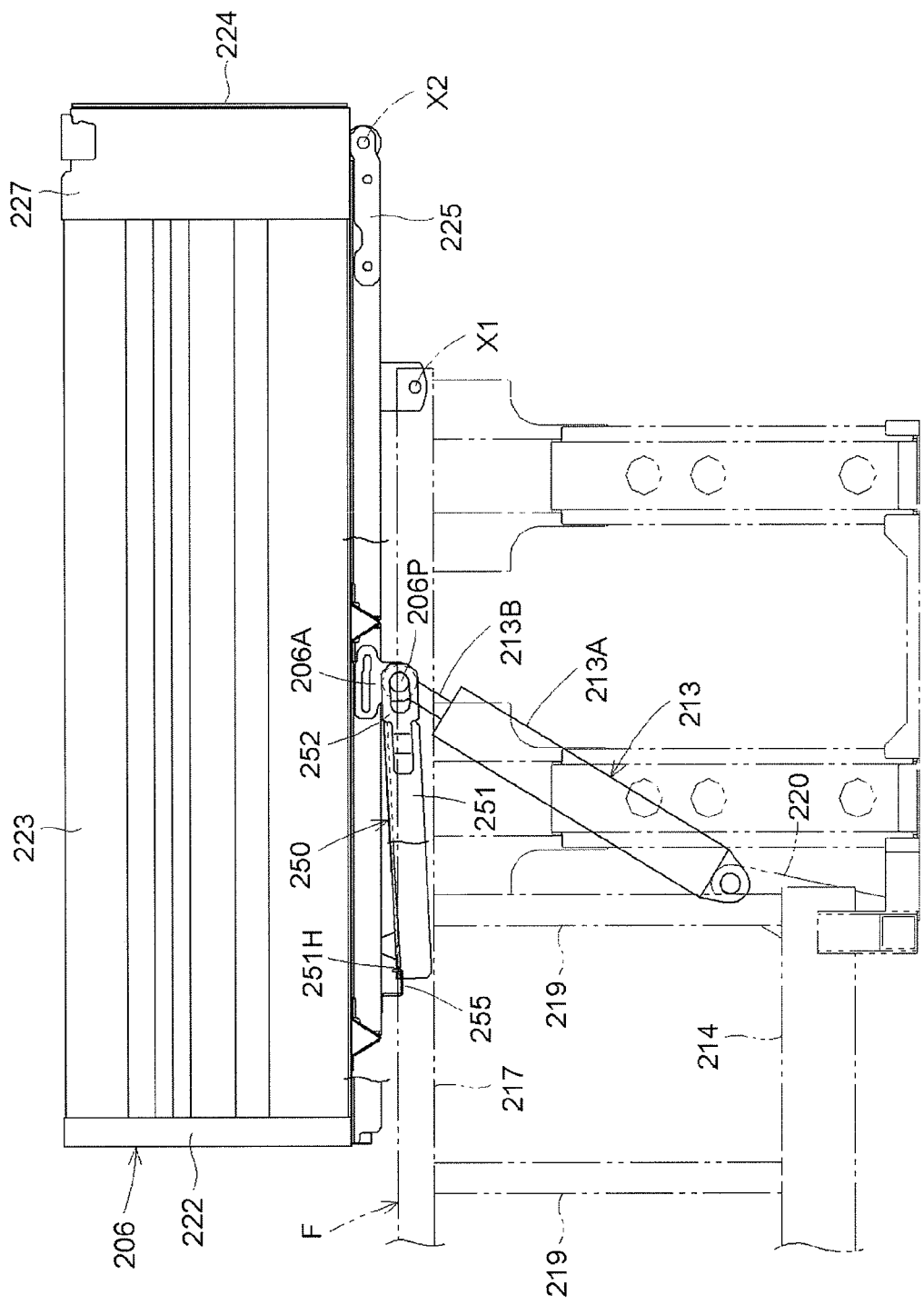

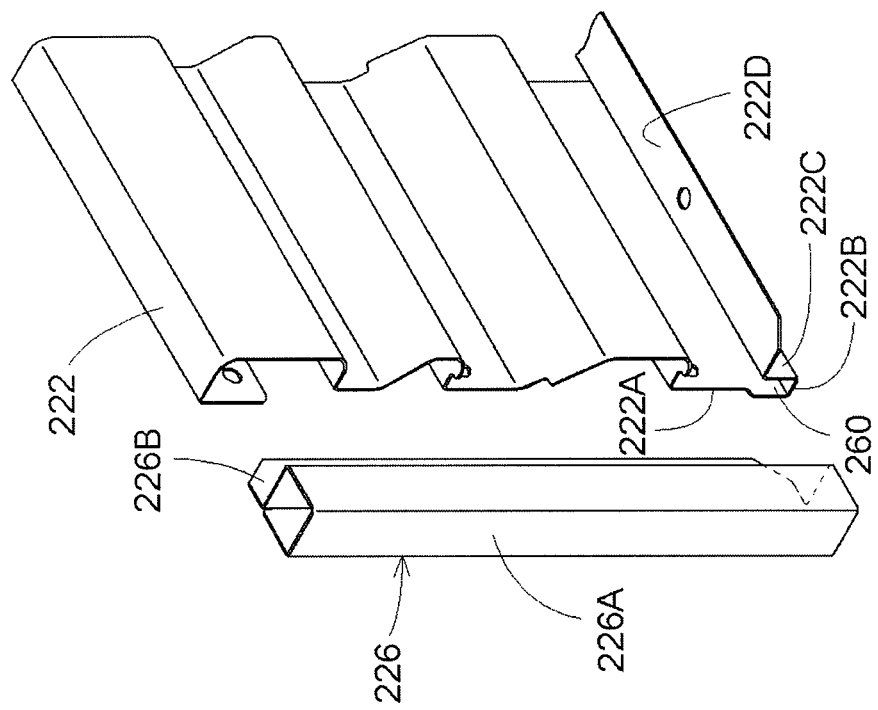
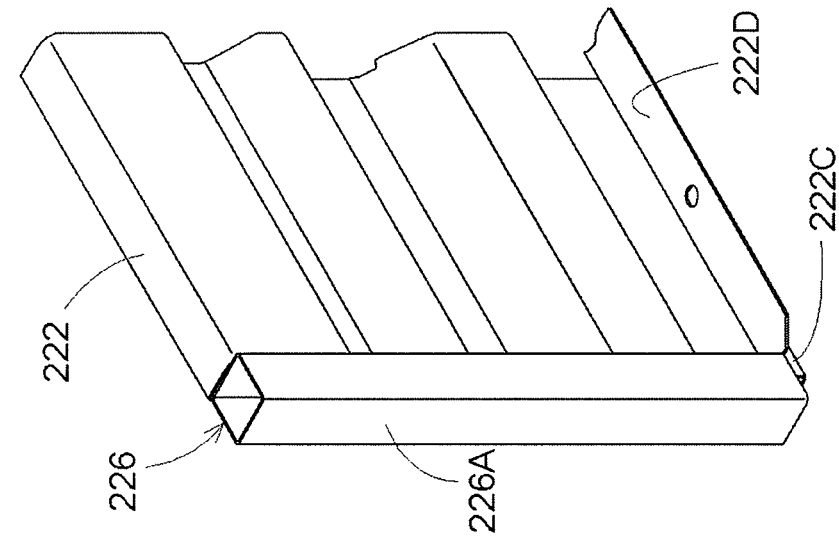
Fig. 37(a)
Fig. 37(b)

WORKING VEHICLE

CROSS-REFERENCE TO RELATED APPLICATIONS

The present application claims priority under 35 U.S.C. §119 of Japanese Application No. 2011-180916, filed on Aug. 22, 2011, Japanese Application No. 2011-180918, filed on Aug. 22, 2011, and Japanese Application No. 2011-181898, filed on Aug. 23, 2011, the disclosures of which are expressly incorporated by reference herein in their entireties.

BACKGROUND OF THE INVENTION

1. Field of the Invention

The present invention relates to a working vehicle in which a muffler reducing engine exhaust sound is arranged at a rear portion of a traveling vehicle body.

2. Description of Related Art

As a working vehicle configured as described above, Related Art 1 discloses a configuration in which a drive unit, in which an engine and a transmission case is connected, is arranged at a rear position of a traveling vehicle body, and a muffler is arranged at a position above the drive unit and below a cargo bed. The muffler has a cylindrical shape and is arranged in an orientation having an axis of the cylindrical shape in a longitudinal direction. The muffler is configured in a manner that an exhaust gas of an engine is supplied to a front end of the muffler and the exhaust gas is discharged from a rear end of the muffler.

Related Art 2 discloses a configuration in which a drive unit configured by an engine and a transmission case is arranged at a rear position of a traveling vehicle body, and, in this working vehicle, a pair of left and right long longitudinal frames that constitute a vehicle main frame are arranged at rear positions of the traveling vehicle body, and the drive unit is arranged in a space surrounded by the pair of left and right long frames in a plan view.

Related Art 2 discloses a configuration in which a muffler having a cylindrical shape and having an axis of the cylindrical shape in the longitudinal direction is arranged at a position parallel to the engine and on a more inner side than the pair of left and right long frames. The muffler is configured in such a manner that an exhaust gas of the engine is supplied from a front end and discharged from a rear end.

[Related Art 1] Japanese Patent Laid-Open Publication No. 2010-190152

[Related Art 2] Japanese Patent Laid-Open Publication No. 2009-67144

As in the utility vehicle disclosed in Related Art 1, in a working vehicle in which a drive unit including an engine and a transmission case is arranged at a rear position of a traveling vehicle body and rear wheels are arranged at two sides of the drive unit, in order to secure a space for arranging the rear wheels, a space for accommodating the drive unit is limited, and thus, a muffler is to be arranged in a limited space.

Further, in a configuration in which a working vehicle is provided with a continuously variable transmission, a space accommodating a drive unit is further narrowed. Therefore, arrangement for a muffler is likely to be difficult, and thus there is room for improvement. In order to avoid such a disadvantage, it is also possible to enlarge a dimension in a vertical direction of the space where the drive unit is arranged. However, in this case where the dimension in the vertical direction is enlarged, a cargo bed arranged above the drive unit is at a high level, and the center of gravity of the traveling vehicle body also rises, and thus, there is room for improvement.

A purpose of the present invention is to reasonably configure a working vehicle in which a muffler is arranged in a limited space without wastefully enlarging a space where a speed change unit is arranged.

As in the working vehicle disclosed in Related Art 2, in a working vehicle in which a drive unit including an engine and a transmission case is arranged at a rear position of a traveling vehicle body and rear wheels are arranged at two sides of the drive unit, in order to secure a space for arranging the rear wheels, a space accommodating the drive unit is limited, and thus, a muffler is to be arranged in such a limited space.

Further, as in the working vehicle disclosed in Related Art 2, in a working vehicle in which longitudinal long frames for supporting an engine and a transmission case are provided, it is necessary to consider positional relationship with the frames to arrange a muffler. It is also possible to displace the frames upward and in a lateral direction in order to arrange the muffler. However, in this case where the frames are displaced, the traveling vehicle body becomes larger, and thus, there is room for improvement.

Another purpose of the present invention is to configure a working vehicle in which a muffler is arranged in a limited space by reasonably utilizing arrangement of frames.

SUMMARY OF THE INVENTION

As an aspect of the present invention, in a working vehicle, a speed change unit is arranged at a rear position of a traveling vehicle body; the speed change unit is arranged in an inclined manner such that an upper position of the speed change unit is displaced more than a lower position of the speed change unit toward one side in a lateral direction of the vehicle body; and a muffler is arranged in a space on the other side in the lateral direction of the vehicle body with respect to the upper position of the speed change unit.

According to this configuration, the upper portion of the speed change unit is displaced toward one side in the lateral direction of the traveling vehicle body so that the space on the other side of the speed change unit in the lateral direction of the vehicle body is enlarged. Therefore, even when the space where the speed change unit is arranged is relatively narrow, the muffler can be arranged without being hindered by the speed change unit. Therefore, a working vehicle can be configured in which a muffler is arranged in a limited space without wastefully enlarging a space where a speed change unit is arranged.

In the present invention, the speed change unit is configured by a continuously variable transmission connected to a rear end portion of a transmission case; a transmission system is configured in which a driving force speed-changed by the continuously variable transmission is transmitted to the transmission case, and is transmitted from the transmission case to left and right rear wheels via left and right rear wheel drive shafts; the continuously variable transmission is configured and arranged in an inclined manner such that an upper position of the continuously variable transmission protrudes above an upper surface of the transmission case, and is displaced more than a lower position of the continuously variable transmission toward the one side in the lateral direction of the vehicle body; and the muffler is arranged on the other side in the lateral direction of the vehicle body with respect to the upper position of the continuously variable transmission and at a position above the rear wheel drive shafts.

According to this configuration, by configuring the continuously variable transmission in an inclined manner such that the upper portion of the continuously variable transmission is displaced toward one side in the lateral direction of the vehicle body, even for a vertically long continuously variable transmission, the amount of upward protrusion of the upper portion of the continuously variable transmission is reduced, and the space on the other side of the upper portion of the continuously variable transmission can be enlarged to arrange the muffler.

In the present invention, the transmission case is connected to a rear portion of an engine; the continuously variable transmission is connected to a rear portion of the transmission case; a drive shaft in a longitudinal orientation for driving front wheels from a lower portion of the transmission case is arranged; the engine is arranged at a position displaced from a center in the lateral direction of the traveling vehicle body to the other side in the lateral direction of the traveling vehicle body; and the drive shaft is arranged at a position displaced from the center in the lateral direction of the traveling vehicle body to the one side in the lateral direction of the traveling vehicle body.

According to this configuration, the driving force speed-changed by the continuously variable transmission can be transmitted from the transmission case to the rear wheels and can be transmitted from the transmission case via the drive shaft to the front wheels. Further, since the engine is displaced to the other side and arranged there, the drive shaft can be arranged at a position that does not interfere with an oil pan and the like at the bottom of the engine. Since the engine is arranged on the other side, a reasonable configuration can be realized such that an exhaust pipe and the like that passes exhaust gas of the engine to the muffler can be linearly arranged.

In the present invention, the continuously variable transmission is provided with a variable capacity type hydraulic pump and a hydraulic motor actuated by hydraulic oil supplied from the hydraulic pump; and an oil filter filtering the hydraulic oil is provided on a lateral side of the continuously variable transmission.

According to this configuration, by adjusting the amount of the hydraulic oil supplied from the hydraulic pump to the hydraulic motor, a driving speed can be continuously controlled. Since the oil filter is provided on a lateral side of the continuously variable transmission, replacement of the oil filter can be easily performed.

In the present invention, a protector protecting the continuously variable transmission may be detachably provided at a rear position of the continuously variable transmission.

According to this configuration, even for a configuration in which the rear end of the continuously variable transmission protrudes rearward from the rear end of the vehicle body frame, the protector protects the continuously variable transmission. For example, even in the case where the traveling vehicle body moves backward, there is no inconvenience such as causing damage to the continuously variable transmission. Further, by removing the protector, maintenance of the continuously variable transmission can be easily performed, and replacement of the oil filter and the like can also be easily performed.

In the present invention, the continuously variable transmission may be configured to include a driving side pulley capable of adjusting a belt winding radius; a driven side pulley; and an endless belt wound around the driving side pulley and the driven pulley.

According to this configuration, the continuously variable transmission is configured as a so-called belt CVT. Therefore, the driving force can be continuously speed-changed with high transmission efficiency to realize traveling.

As another aspect of the present invention, in a working vehicle, a speed change unit is arranged at a rear position of a traveling vehicle body. A vehicle body frame of the traveling vehicle body includes a pair of left and right upper frames extending in a longitudinal direction; vertical frames arranged in an inclined orientation such that upper ends of the vertical frames are connected to the left and right upper frames, and lower ends of the vertical frames are displaced toward an inner side of the traveling vehicle body with respect to the upper ends; and an underframe connected to the lower ends of the vertical frames. Thereby, an inverted trapezoid is formed with an imaginary line connecting the upper ends of the vertical frames on left and right sides as an upper base, and an imaginary line connecting the lower ends of the vertical frames on the left and right sides as a lower base. Inside a space forming the inverted trapezoid, a speed change unit is arranged at a lower position of the inverted trapezoid. Inside the space forming the inverted trapezoid, a muffler is arranged in a vicinity of one of upper left and right corners of the inverted trapezoid.

According to this configuration, as viewed in the longitudinal direction, a space of an inverted trapezoid shape is formed by the pair of left and right upper frames, the left and right vertical frames in inclined orientations, and the underframe. Therefore, inside this space of the inverted trapezoid shape in the vehicle body frame, the muffler is arranged at a position in the vicinity of an upper left or right corner. Thereby, the muffler can be arranged at a corner of the vehicle body frame in a state being protected by the vehicle body frame. Further, the muffler is arranged at an upper position. Therefore, it is possible to linearly introduce an exhaust gas from an exhaust system on an upper portion of the engine to an exhaust pipe and the like, and replacement of the muffler can also be easily performed. Therefore, a working vehicle is configured in which a muffler is arranged in a limited space by reasonably utilizing arrangement of frames.

In the present invention, base ends of suspension arms are supported on the vertical frames in a manner vertically swingable about longitudinally oriented swing axes; rear wheels are rotatably supported on swing ends of the suspension arms; and upper ends of suspension units that are compressed when the suspension arms swing upward are supported on the upper frames or on members in vicinities of the upper frames.

According to this configuration, the upper end sides of the vertical frames are displaced more than the outer ends of the underframe toward the outer sides of the vehicle body. Therefore, the upper frames are displaced toward the outer sides of the vehicle body. For this reason, when the upper ends of the suspension units are supported on the upper frames, inclination angles of the suspension units are reduced, orientations of the suspension units can be arranged close to orientations parallel to swing trajectories of the suspension anus (orientations perpendicular to the arm surfaces of the suspension arms), and low-impact compression of the suspension units can be performed.

In the present invention, a mount frame is provided as the underframe; the mount frame is configured to have a dimension in a width direction of the traveling vehicle body shorter than a distance between the left and right upper frames in the width direction of the traveling vehicle body; a drive unit transmitting a driving force to the rear wheels is supported on the mount frame; and the muffler is supported on the drive unit.

According to this configuration, the drive unit is supported on the mount frame and the muffler is supported on the drive unit. Thereby, the muffler can be supported in a stable state.

In the present invention, a lateral frame is provided connecting the left and right upper frames; an upper portion of the drive unit is supported by the lateral frame; and the muffler is arranged at a position in a vicinity of a lower side of the lateral frame.

According to this configuration, the upper portion of the drive unit is supported by the lateral frame that connects the left and right upper frames. Thereby, the drive unit can be supported in a stable state. Further, the muffler is arranged on the lower side of the lateral frame. Thereby, the muffler can also be protected by the lateral frame.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 22 is a partial cutaway perspective view illustrating a floor panel, a side panel, and a rear gate;

FIGS. 23($a$) and 23($b$) are rear views illustrating a lock mechanism of the rear gate;

FIG. 32 is a side view illustrating a vicinity of a dump cylinder of a cargo bed (at a lowered position);

FIGS. 37($a$) and 37($b$) are exploded perspective views illustrating the front end portion of the cargo bed.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

In the following, embodiments of the present invention are explained based on the drawings.

(Overall Configuration)

Figure 1:
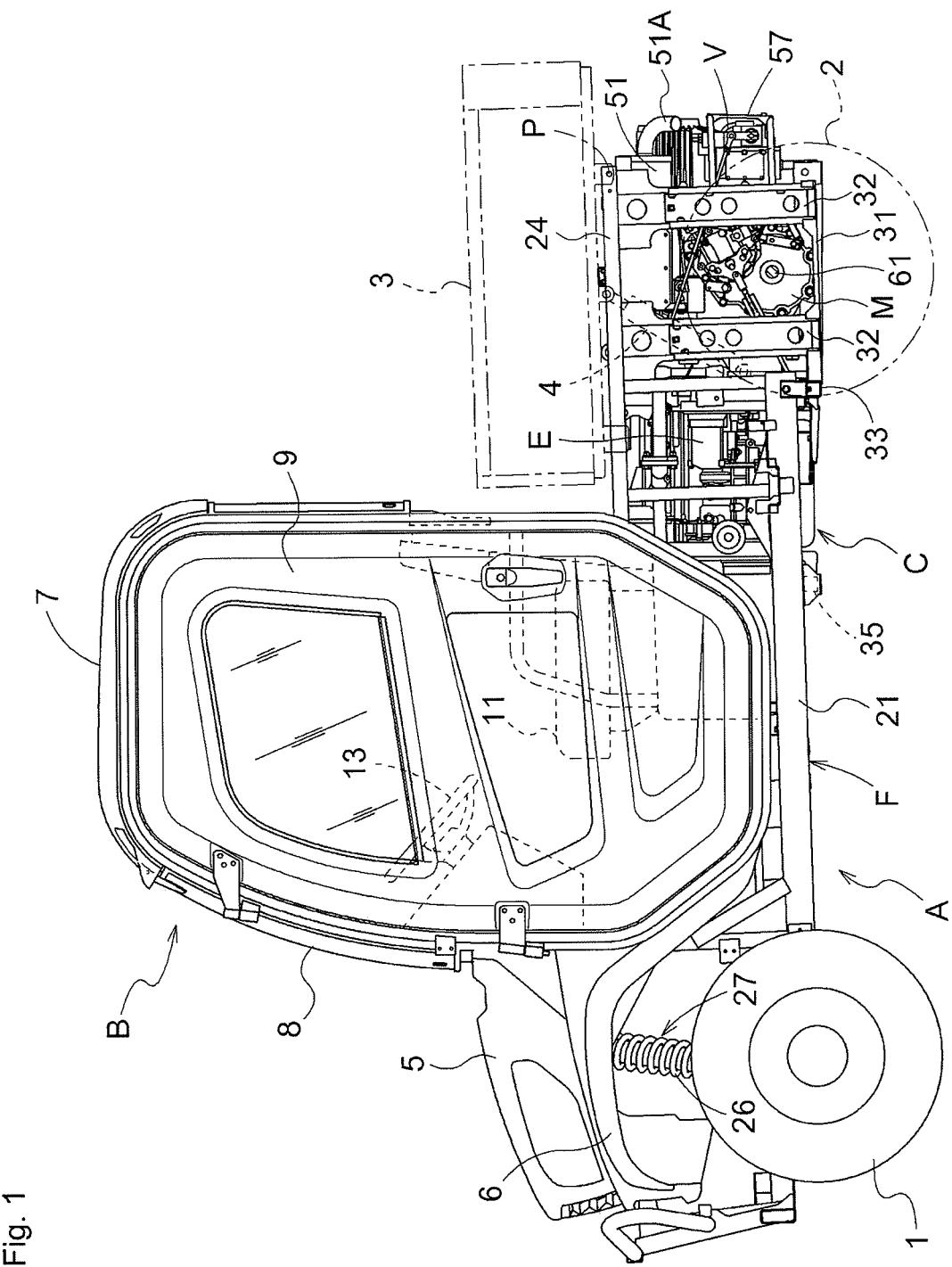
FIG. 1 is an entire side view of a working vehicle.
Figure 2:
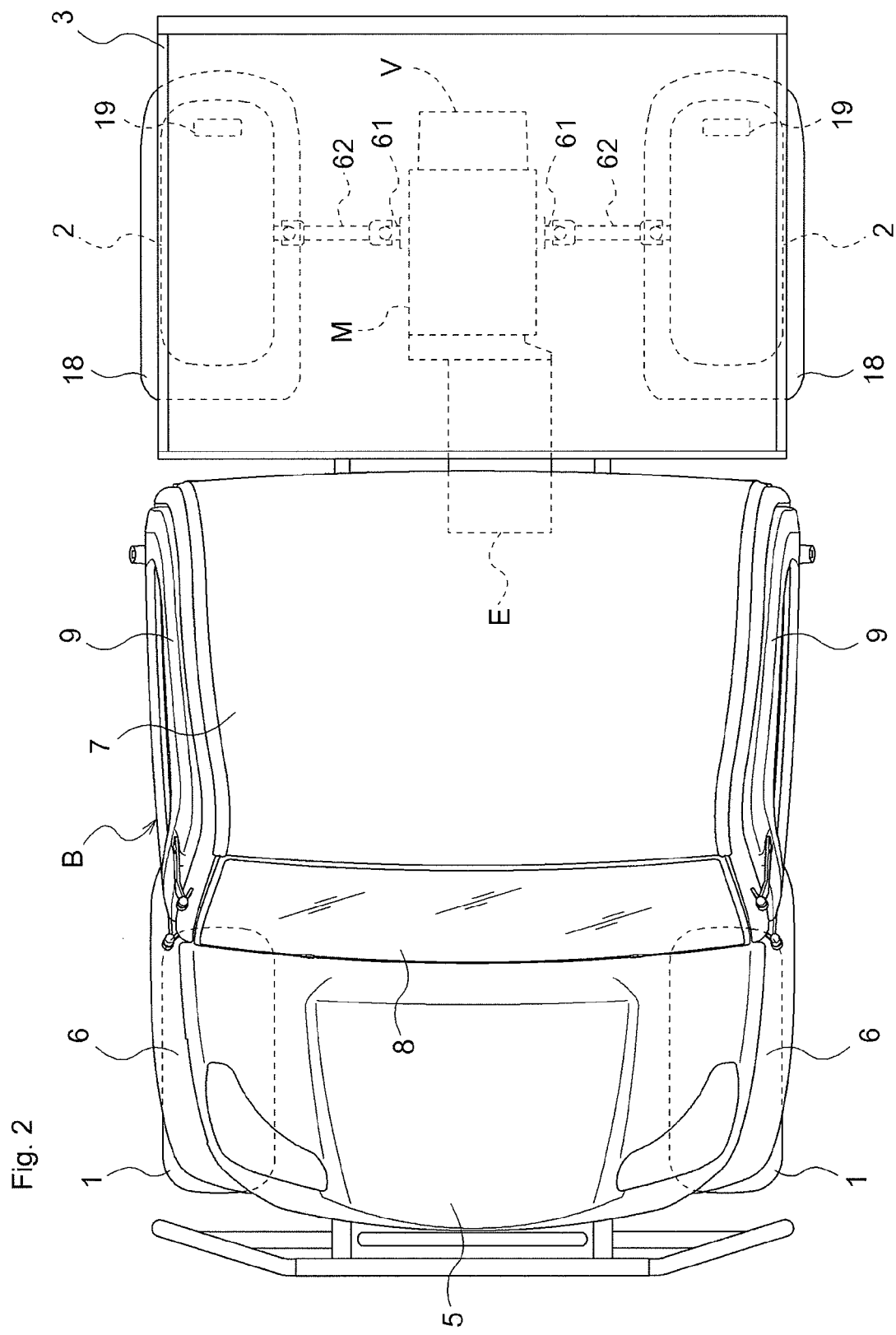
FIG. 2 is an entire plan view of the working vehicle.
Figure 3:
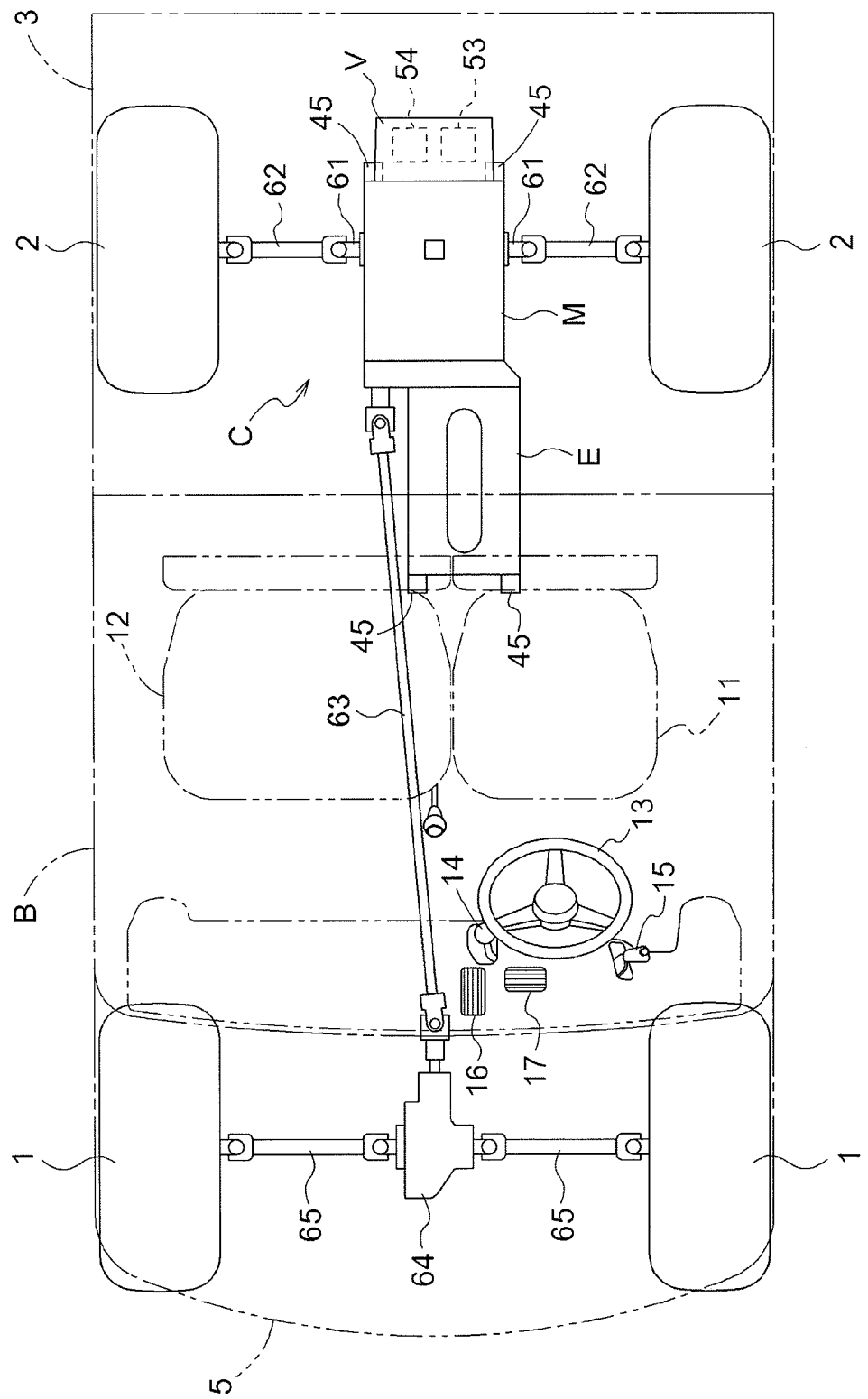
FIG. 3 is a plan view illustrating a transmission system of the working vehicle.

As FIGS. 1-3 illustrate, a working vehicle is configured in which a traveling vehicle body A is provided with a pair of freely steerable left and right front wheels 1 and a pair of left and right rear wheels 2; a cabin B constituting an operating unit is provided at a front position of the traveling vehicle body A; a cargo bed 3 is provided at a rear portion of the traveling vehicle body A; and a drive unit C is provided at a position below the cargo bed 3.

This working vehicle is of a four-wheel drive type that has a travel drive system transmitting a driving force from the drive unit C to the front wheels 1 and the rear wheels 2, and is configured as a utility vehicle used for multipurpose work such as agricultural work and transportation work. The cargo bed 3 is configured in a manner that a rear end side of the cargo bed 3 is swingably supported about a laterally oriented axis P at a rear end position of the traveling vehicle body A, and a front end side of the cargo bed 3 can be raised via actuation of a dump cylinder 4 to unload a load backward.

A hood 5 operable to open and close is provided at a front position of the traveling vehicle body A, and front fenders 6 covering the upper area of the front wheels 1 are arranged at the lower left and right of the hood 5. The cabin B is provided with a windshield 8 at a front portion of a cabin body 7 and doors 9 operable to open and close with respect to lateral sides of the cabin body 7.

The cabin B is provided with a driver seat 11, on which a driver sits, and a laterally-long two-seater assistant seat 12 adjacent to the driver seat 11. Further, in the front area of the driver seat 11, the cabin B is provided with a steering wheel 13 steering-controlling the front wheels 1, a main speed change lever 14, and a parking lever 15. In the lower area, the cabin B is provided with an accelerator pedal 16 as a speed change operation tool controlling a traveling speed, and a brake pedal 17 operating brake devices (not illustrated in the drawings) of the front wheels 1 and the rear wheels 2.

Rear fenders 18 covering the upper area of the left and right rear wheels 2 are provided at the rear end side of the traveling vehicle body A. Brake lights 19 are provided on the rear fenders 18.

(Vehicle Body Frame)

Figure 4:
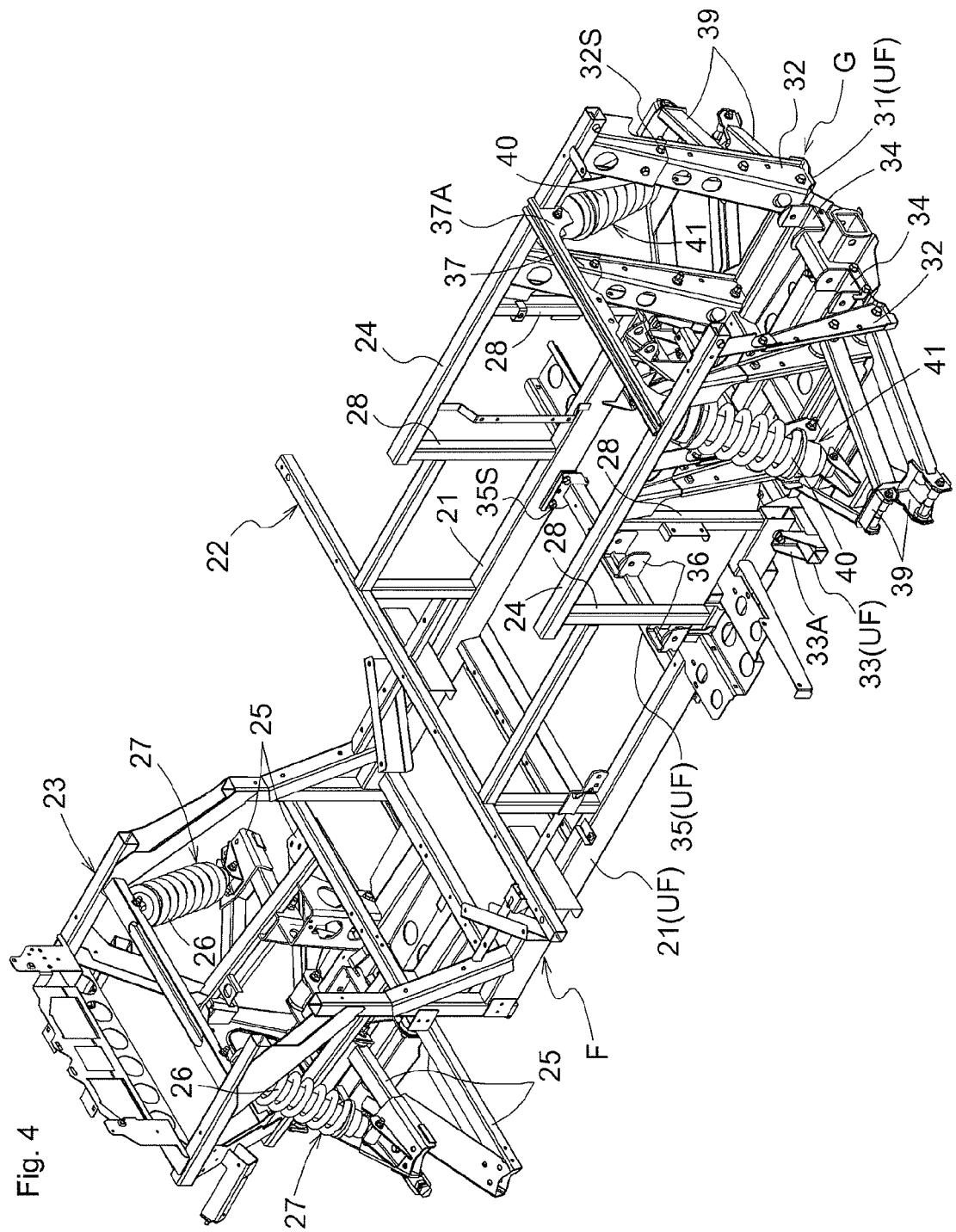
FIG. 4 is a perspective view of a vehicle body frame.

A vehicle body frame F is provided as a strength member of the traveling vehicle body A. As FIG. 4 illustrates, the vehicle body frame F is configured to include a pair of left and right main frames 21 extending in a longitudinal direction; a cabin frame unit 22 supporting the cabin B at a front position of the main frames 21; a front frame unit 23 connecting front ends of the main frames 21; a pair of left and right upper frames 24 located at positions above a rear position of the main frames 21 and extending in the longitudinal direction of the traveling vehicle body A in parallel to the main frames 21; and a detachable frame unit G supporting the drive unit C.

Square-shaped steel pipes are used for the main frames 21 and the upper frames 24, and steel products such as squared pipes and channels are used for the cabin frame unit 22 and the front frame unit 23.

The cabin frame unit 22 is configured as a structure that includes a laterally oriented frame body arranged at a front portion of the cabin B and a laterally oriented frame body arranged at a lower side of the driver seat 11. The front frame unit 23 is a structure arranged below the hood 5, and, at each of the left and right positions of the front frame unit 23, base end portions of a pair of upper and lower front suspension arms 25 configured as of a double wishbone type are supported in a manner swingable about longitudinally oriented swing axes. Further, lower ends of front suspension units 27 are supported by the front suspension arms 25, the front suspension units 27 having front suspension springs 26 that are compressed when the front suspension arms 25 swing upward. Upper ends of the front suspension units 27 are supported by the front frame unit 23.

The left and right main frames 21 and the upper frames 24 that are arranged above the main frames 21 are connected by vertically oriented connecting frames 28 that are formed with square-shaped steel pipes. Further, at a position adjacent to a rear end side of the main frames 21 and below the upper frames 24, the detachable frame unit G is arranged in a manner separably connected to the main frames 21 and the upper frames 24.

Figure 5:
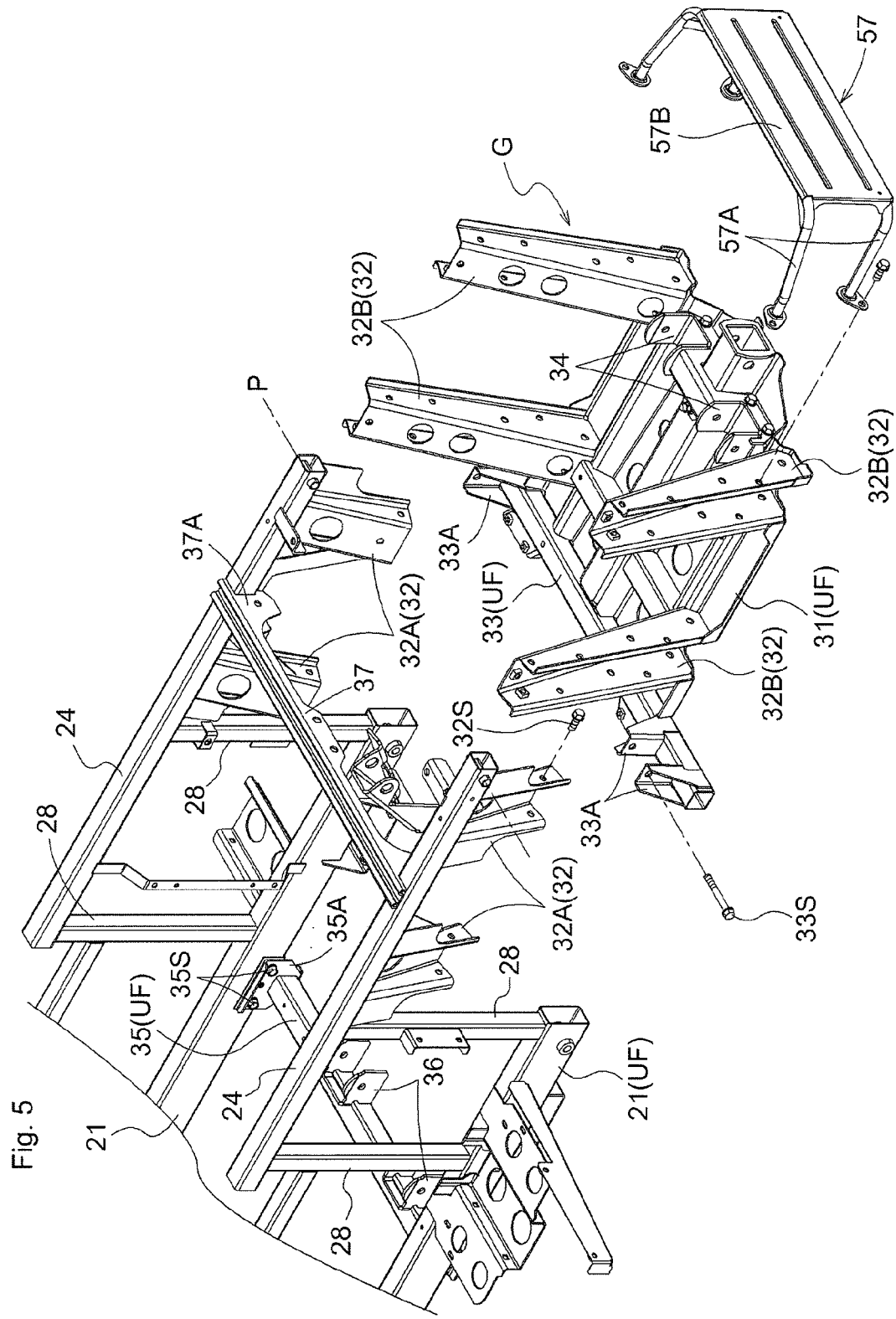
FIG. 5 is a perspective view illustrating a detachable unit of a rear portion of the vehicle body frame.
Figure 6:
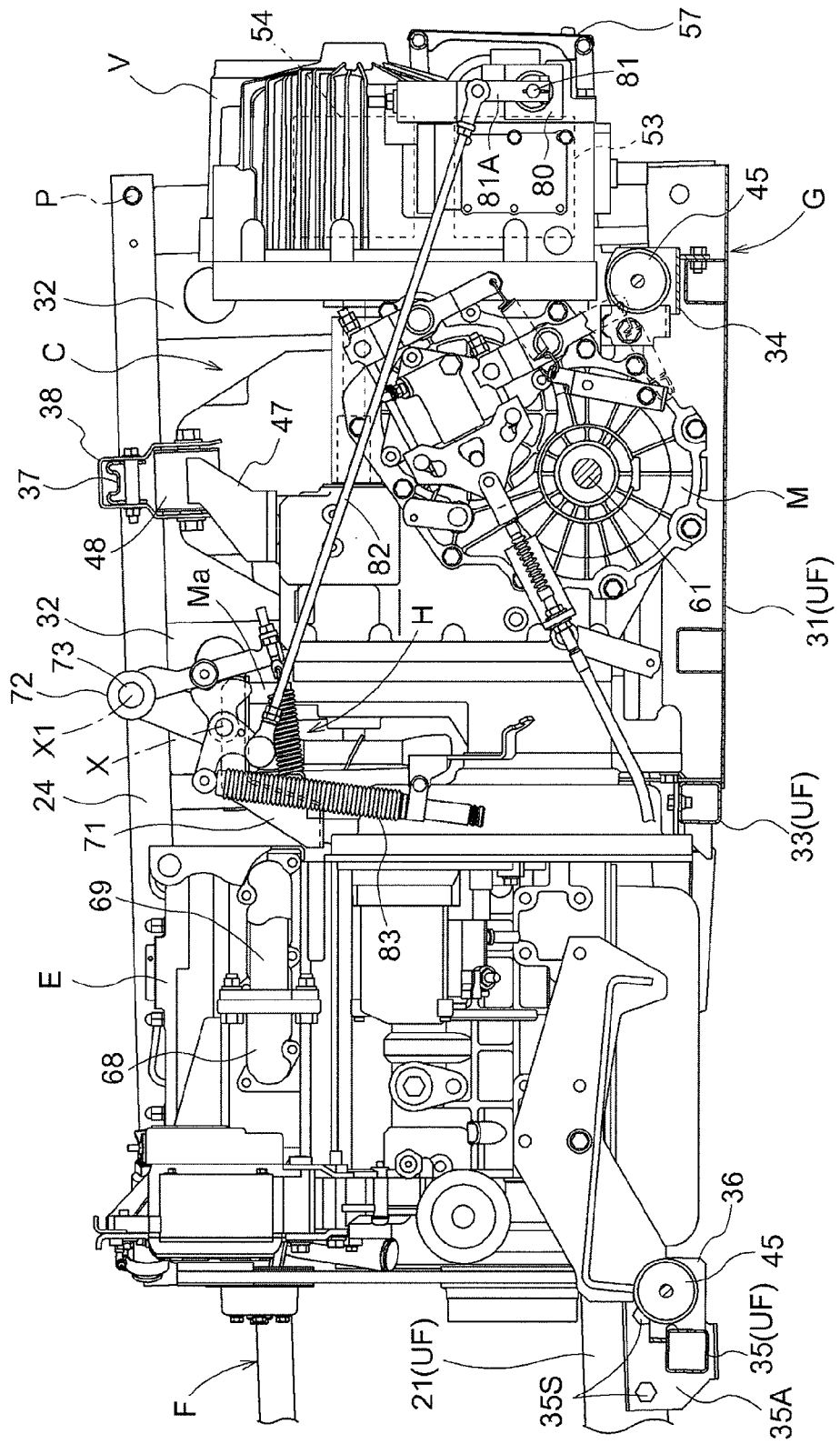
FIG. 6 is a side view of a drive unit.

As FIG. 6 illustrates, the drive unit C has a configuration that connects an engine E, a transmission case M, and a continuously variable transmission V (which is an example of a speed change unit). As FIGS. 5 and 6 illustrate, the detachable frame unit G is configured to include a mount frame 31 arranged at a lower side of the drive unit C (lower than the upper frames 24); two vertical frames 32 arranged on each of the left and right sides of the mount frames 31 connecting the mount frame 31 to the left and right upper frames 24, the vertical frames 32 each having a U-shaped cross-sectional shape; and a front frame 33 in a lateral orientation formed at a front end side of the mount frame 31.

The detachable frame unit G also supports the rear wheels 2, as will be described later, and is configured in a manner detachable from the vehicle body frame F, by separating the detachable frame unit G from the other frames, in a state in which the drive unit C and the rear wheels 2 are supported by the detachable frame unit G.

The mount frame 31 is formed by working, such as press working, a steel plate and has rib-like portions formed thereon to increase strength. The mount frame 31 has a lateral width configured to be shorter than a lateral distance between the left and right upper frames 24. The mount frame 31 is provided with a pair of left and right rear mount supports 34 to support the transmission case M. Further, in order to linearly connect two end portions of the mount frame 31 and the upper frames 24 via the vertical frames 32, the left and right vertical frames 32 are provided in an inclined manner such that an upper end side is increasingly displaced toward the outside of the vehicle body.

Figure 8:
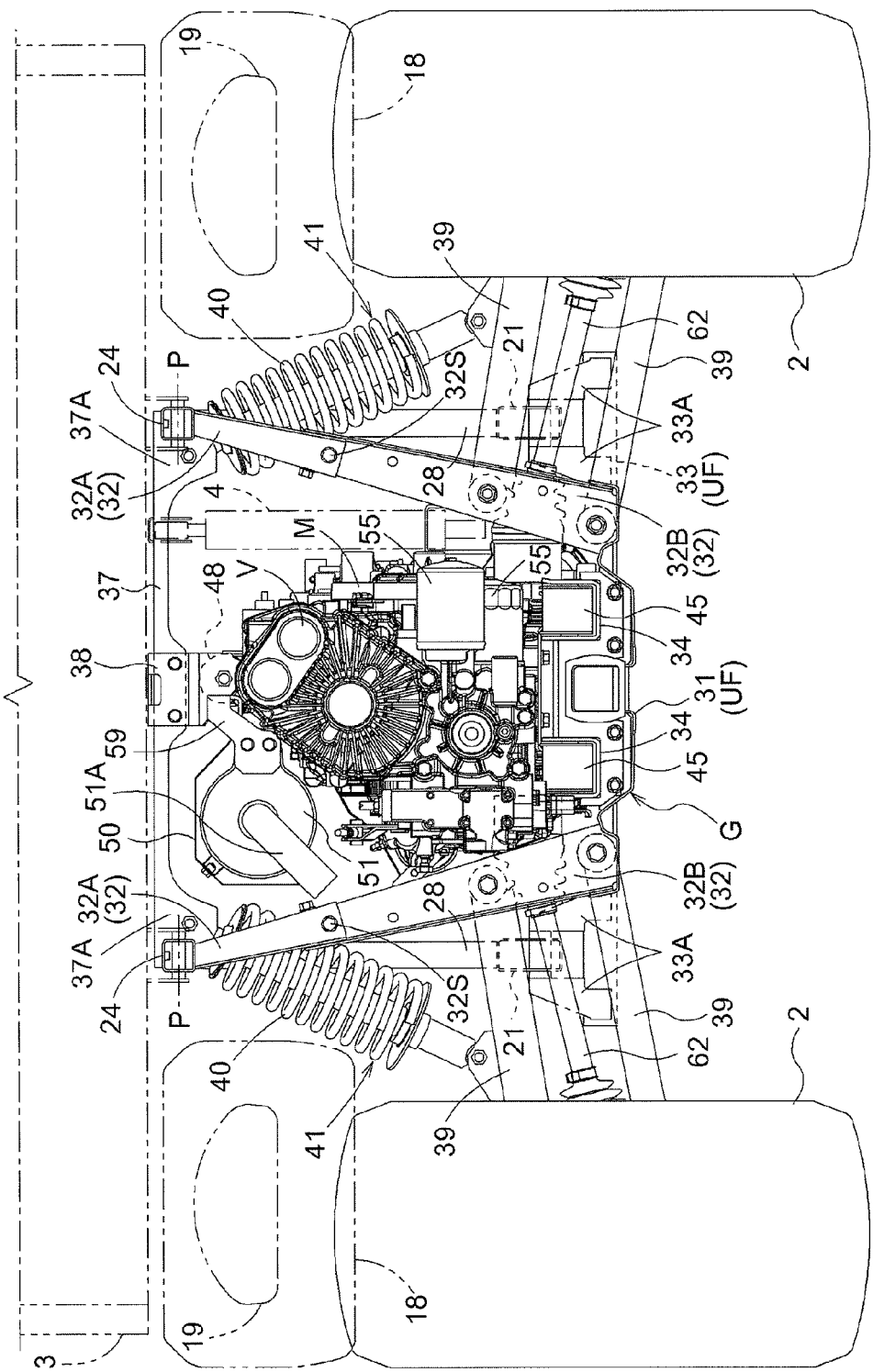
FIG. 8 is a rear view of a traveling vehicle body.

That is, as FIGS. 4, 5 and 8 illustrate, as viewed in the longitudinal direction, by providing the pair of left and right upper frames 24 at an upper portion, the mount frame 31 (which is an example of an underframe UF) at a lower portion, and the vertical frames 32 at two sides in an inclined manner such that an upper end side is increasingly displaced toward the outside of the vehicle body, when an imaginary line connecting upper ends of the left and right vertical frames 32 is used as an upper base and an imaginary line connecting lower ends of the left and right vertical frames 32 is used as a lower base, respective positional relationships are configured in such a manner that an inverted trapezoid is formed of which the upper base has a longer length than the lower base.

The vertical frames 32 are formed using channel-shaped steel and have a configuration in which upper members 32A, upper ends of which are connected to the upper frames 24, and lower members 32B, lower ends of which are connected to the mount frame 31, are separably connected to one another. A portion of an upper member 32A and a portion of a lower member 32B are overlapped, and such overlapping portions are separably connected to one another by inserting connecting bolts 32S through the overlapping portions. Further, brackets 33A are provided at two end portions of the front frame 33, and, by inserting insertion bolts 33S through the brackets 33A, the front frame 33 is separably connected to rear ends of the main frames 21.

A support frame 35 (which is an example of the underframe UF) formed with a square-shaped steel pipe is arranged in a lateral orientation near rear portions of the left and right main frames 21. Flange portions 35A of left and right end portions of the support frame 35 are separably connected to the main frames 21 by flange bolts 35S. Further, a pair of left and right front mount supports 36 are formed on the support frame 35 to support the engine E.

It is not necessary to use a plate material for the mount frame 31. The mount frame 31 may also be configured using a pair of left and right squared pipes. Further, it is also possible that the vertical frames 32 are not configured to have separable middle portions. For example, it is also possible to have a configuration in which upper end portions of the vertical frames 32 are separably connected to the upper frames 24. It is also possible to have a configuration in which lower end portions of the vertical frames 32 are separably connected to the mount frame 31.

A lateral frame 37 in a lateral orientation, which is formed with steel and has two ends connected to the left and right upper frames 24, is provided in a form bridging the upper frames 24 near rear ends of the upper frames 24. An upper mount support 38 is provided at a middle position of the lateral frame 37 for supporting the transmission case M in a form where the transmission case M hangs from the upper mount support 38. Suspension support portions 37A are formed at two end portions of the lateral frame 37.

The above described main frames 21, mount frame 31, front frame 33, and support frame 35 are arranged at lower positions on the vehicle body frame F. Therefore, these main frames 21, mount frame 31, front frame 33, and support frame 35 are collectively referred to as the underframe UF. As described above, the mount frame 31, the support frame 35, and the lower members 32B of the vertical frames 32 are separable with respect to other frames. Therefore, a portion of the underframe UF is configured to be separable.

With respect to the lower members 32B of the vertical frames 32 on each of the left and right sides, base end portions of a pair of upper and lower rear suspension arms 39 configured as of a double wishbone type are supported in a manner swingable about longitudinally orientated swing axes. Further, lower ends of rear suspension units 41 are supported by the rear suspension arms 39, the rear suspension units 41 having rear suspension springs 40 that are compressed when the rear suspension arms 39 swing upward. Upper ends of the rear suspension units 41 are supported by the suspension support portions 37A of the lateral frame 37. The upper ends of the rear suspension units 41 may be supported by the upper frames 24. It is also possible that support brackets are provided on the upper frames 24 and the upper ends of the rear suspension units 41 are supported by the support brackets.

(Drive Unit)

As FIGS. 3, 6, 7, 9, and 10 illustrate, the drive unit C is configured with the engine E, the transmission case M, and the continuously variable transmission V integrated by connecting in this order the engine E, the transmission case M, and the continuously variable transmission V. Two lower left and right portions of a front end position of the engine E are supported in the pair of left and right front mount supports 36 of the support frame 35 by lower anti-vibration mounts 45. Two lower left and right portions of a rear end position of the transmission case M are supported in the pair of left and right rear mount supports 34 of the mount frame 31 by lower anti-vibration mounts 45. An upper end portion of a hanging frame 47 that protrudes from an upper surface of the transmission case M is supported in the upper mount support 38 by an upper anti-vibration mount 48.

These lower anti-vibration mounts 45 and the upper anti-vibration mount 48 are configured with bush-type anti-vibration rubber, and inhibits vibration transmitted from the drive unit C to the vehicle body frame F. As described above, the lateral width of the mount frame 31 is relatively short. Therefore, the distance between the left and right lower anti-vibration mounts 45 that support the transmission case M is designed to be short, and a configuration is formed in which the upper portion of the drive unit C is likely to vibrate in the lateral direction. With regard to this point, the transmission case M is supported with respect to the lateral frame 37 in a form where the upper portion of the transmission case M is hung on the upper anti-vibration mount 48, the lateral frame 37 being provided bridging the left and right upper frames 24. Therefore, the vibration of the drive unit C in the lateral direction can be inhibited.

A muffler 51 having a cover 50 thereabove for protection against heat is provided at a left side of an upper position of the transmission case M to reduce exhaust sound of the engine E.

An internal structure of the transmission case M is not illustrated in the drawings. However, the transmission case M internally has a gear-type transmission and a differential gear (not illustrated in the drawings), the transmission speed-changing a driving force speed-changed by the continuously variable transmission V into a plurality of speeds and performing forward and backward switching.

Figure 7:
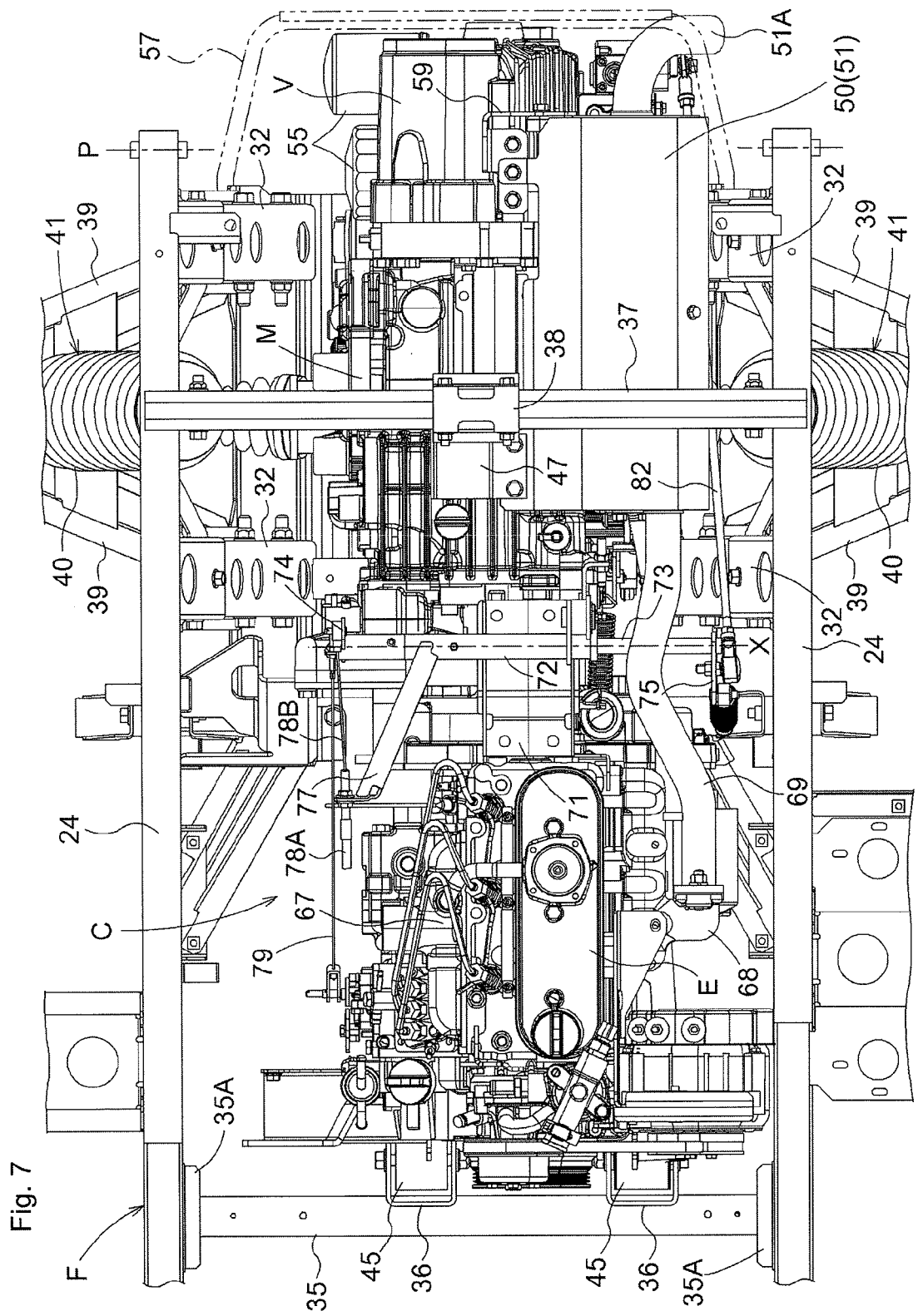
FIG. 7 is a plan view of the drive unit.
Figure 10:
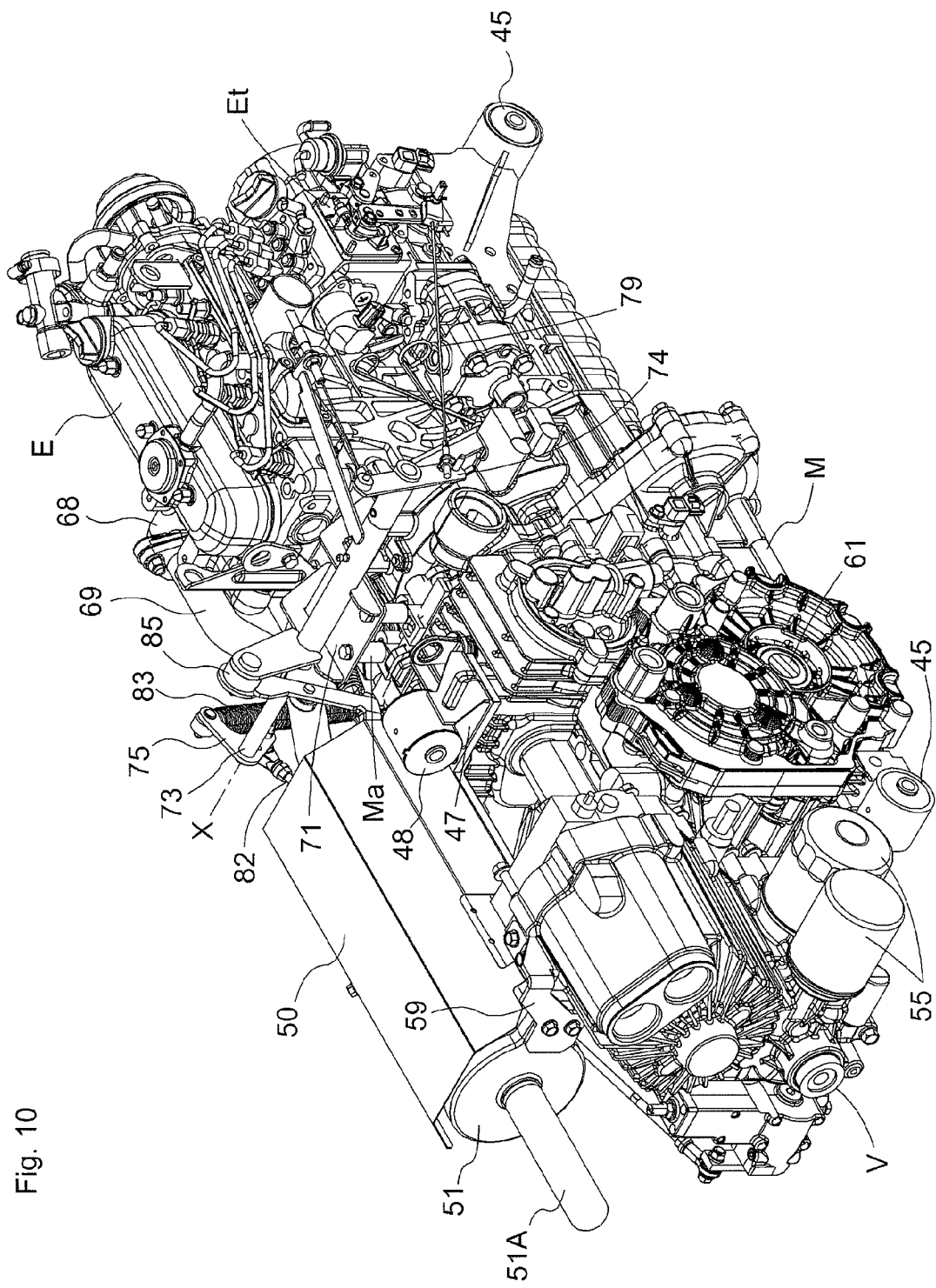
FIG. 10 is a perspective view of the drive unit and the speed change operation structure.
Figure 11:
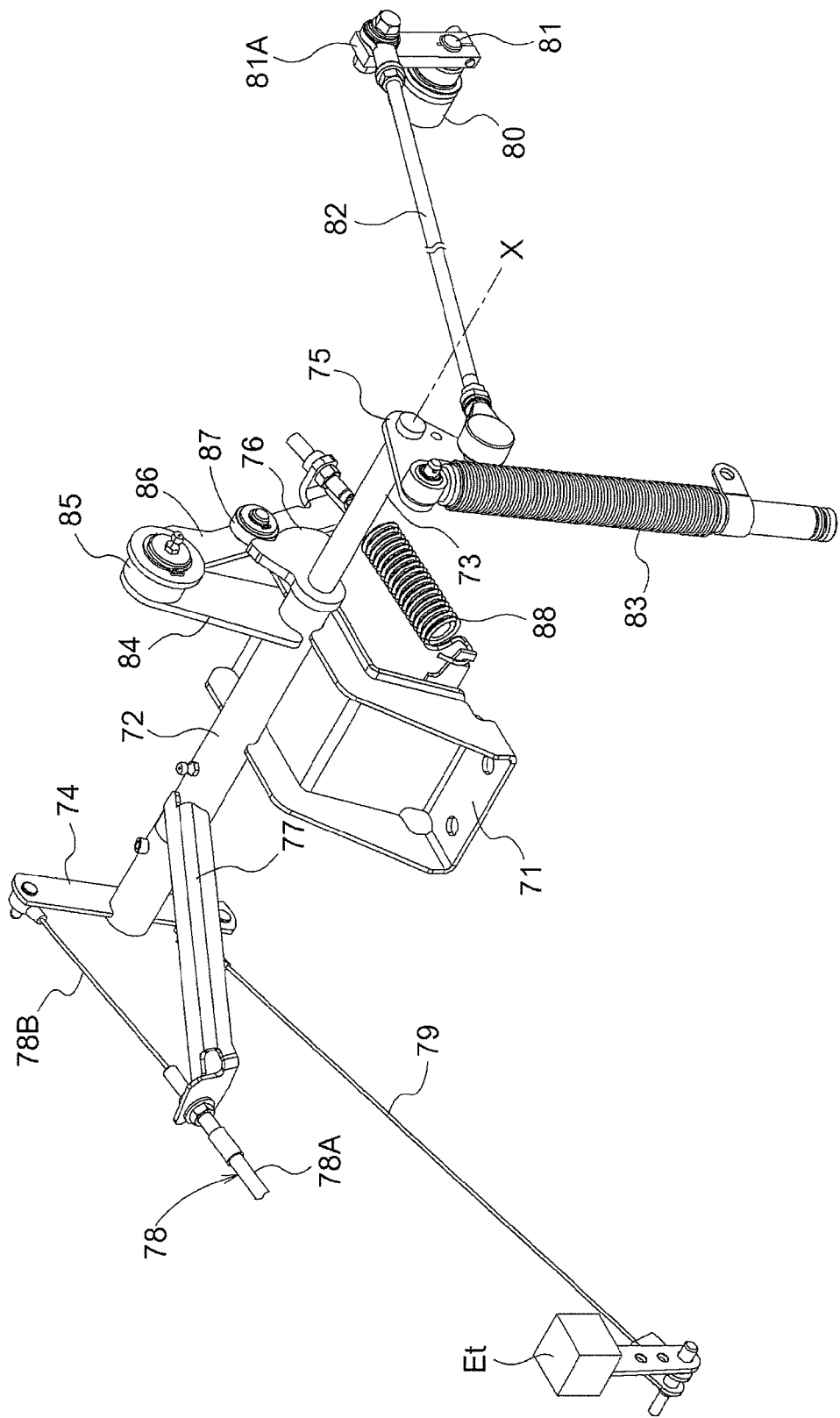
FIG. 11 is a perspective view of the speed change operation structure.

As FIG. 6 illustrates, the continuously variable transmission V includes a hydraulic pump 53 of a variable capacity and axial plunger type, which operates by using a driving force from the engine E, and a hydraulic motor 54 of an axial plunger type, which rotates by using hydraulic oil supplied from the hydraulic pump 53. As FIGS. 7 and 10 illustrate, at a lateral side of a rear portion of the continuously variable transmission V, two oil filters 55 filtering the hydraulic oil are detachably provided. One of the two oil filters 55 is arranged on a suction side to suck the hydraulic oil into the hydraulic pump, and the other is arranged on a drain side to drain the hydraulic oil.

In the drive unit C, a transmission system is configured in which the engine E is provided in a manner that an axis of an output shaft (crankshaft: not illustrated in the drawings) thereof is configured in the longitudinal direction; the driving force from the engine E is transmitted to the hydraulic pump 53 of the continuously variable transmission V by passing a transmission shaft (not illustrated in the drawings) coupled to the output shaft through the transmission case M in the longitudinal direction; and a driving force from the hydraulic motor 54 of the continuously variable transmission V is transmitted to the transmission case M. Further, in the transmission case M, the transmission system is configured in a manner that the driving force is speed-changed by the transmission, is transmitted to left and right rear output shafts 61 from the differential gear, and is transmitted from the rear output shafts 61 to the left and right rear wheels 2 via rear wheel drive shafts 62; and in addition, as FIG. 3 illustrates, the driving force is transmitted from a lower output shaft (not illustrated in the drawings) formed at a lower side and a drive shaft 63 to a front wheel differential gear 64, and is further transmitted from front wheel drive shafts 65 to the left and right front wheels 1.

In particular, in order to avoid contact between the drive shaft 63 and an oil pan on a lower portion of the engine E, a center position of the engine E in the lateral direction is arranged to be deviated to the left side with respect to a center position of the transmission case M in the lateral direction. It is also possible that the center position of the engine E in the lateral direction is arranged to be deviated to the right side with respect to the center position of the transmission case M in the lateral direction, and the drive shaft 63 is arranged on the left side of the lower portion of the engine E.

Figure 13:
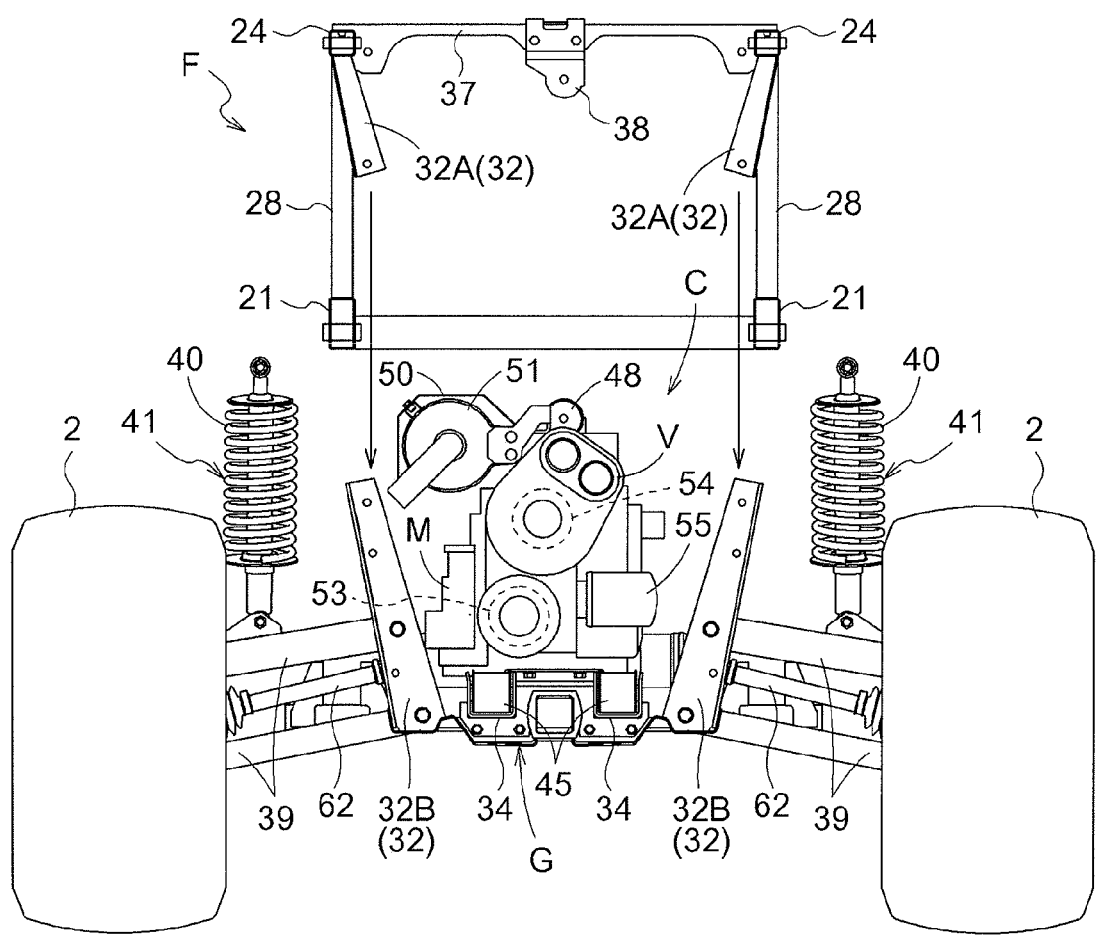
FIG. 13 is a rear view illustrating a detachable frame unit in a separated state.

As FIGS. 6 and 13 illustrate, the continuously variable transmission V is configured in a manner that the hydraulic pump 53 is arranged at a lower side and the hydraulic motor 54 is arranged at an upper side. In this configuration, an upper end level of the continuously variable transmission V is configured to be at a position higher than an upper surface of the transmission case M. The upper end of the continuously variable transmission V protrudes above the upper surface of the transmission case M. In order to reduce the amount of the upward protrusion of the continuously variable transmission V and to enlarge a positioning space for the muffler 51 on the left side portion of the upper portion of the continuously variable transmission V, the continuously variable transmission V is configured to be in an inclined state in a manner that the upper end side of the continuously variable transmission V is displaced toward the right side (outside) as viewed in the longitudinal direction. It is also possible to have a configuration in which the continuously variable transmission V is configured to be in an inclined state in a manner that the upper end side of the continuously variable transmission V is displaced toward the left side (outside) as viewed in the longitudinal direction, and the muffler 51 is arranged on the right side of the continuously variable transmission V. Further, it is also possible to arrange the muffler 51 outside of the vehicle body frame F.

The continuously variable transmission V is arranged at a position such that a rear end portion of the continuously variable transmission V protrudes slightly backward from a rear end of the vehicle body frame F. As FIGS. 5 and 7 illustrate, a protector 57 protecting the rear end portion is provided at the rear end of the vehicle body frame F. The protector 57 is configured to include pipe frames 57A, which are separably connected to back sides of the lower members 32B of the left and right vertical frames 32 in the rear position, and a protection plate 57B, which has a shape of a vertical wall and is supported by the pipe frames 57A. By separating the pipe frames 57A from the vertical frames 32, the protector 57 is separated from the vehicle body frame F, which facilitates replacement of the oil filters 55 and maintenance of the continuously variable transmission V.

Figure 9:
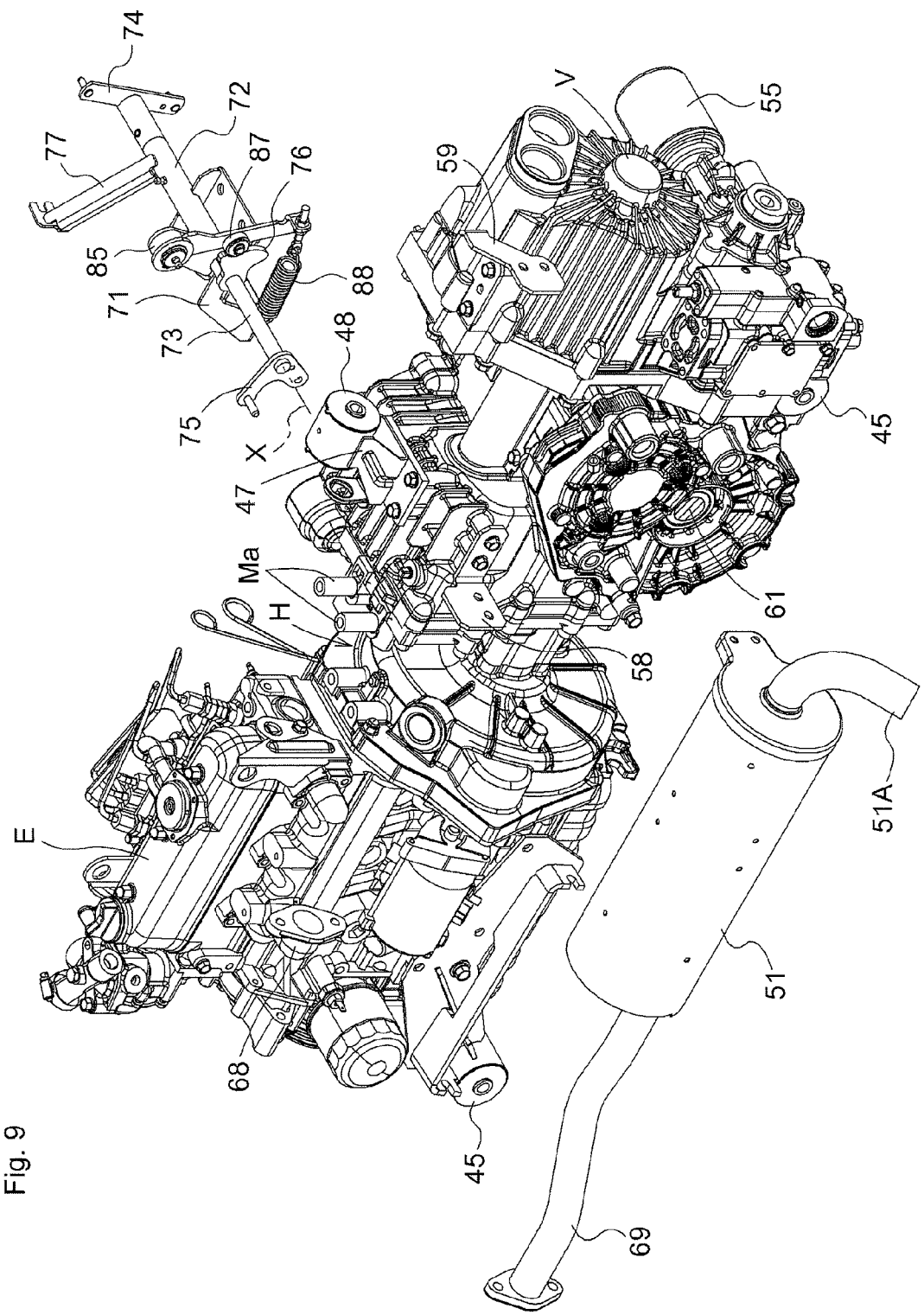
FIG. 9 is a perspective view of a state in which a speed change operation structure is separated from the drive unit.

As FIGS. 7, 9, and 10 illustrate, the engine E is provided with an intake manifold 67 on the right side of the upper surface thereof supplying air from an air cleaner (not illustrated in the drawings). The engine E is further provided with an exhaust manifold 68 on the left side. An exhaust pipe 69 is arranged between the exhaust manifold 68 and the muffler 51.

The muffler 51 is formed in a cylindrical shape, and is provided with a curved cylindrical exhaust portion 51A at a rear end to discharge exhaust gas in the left downward direction. The muffler 51 has a front end portion supported by a front bracket 58 on an upper surface of the transmission case M and a rear end portion supported by a rear bracket 59 on an upper surface of the continuously variable transmission V. The cover 50 for protection against heat has a front end portion supported by screws and the like on the upper surface of the transmission case M and a rear end portion supported by screws and the like on the upper surface of the continuously variable transmission V. Further, the above described exhaust portion 51A is arranged at a position where the exhaust portion 51A does not contact the cargo bed 3 when the cargo bed 3 is raised, and the exhaust direction of the exhaust portion 51A is configured in a manner that the exhaust gas is discharged to a space where no parts exist in its neighborhood. Although not illustrated in the drawings, the front bracket 58 supporting the front end portion of the muffler 51 and the rear bracket 59 supporting the rear end portion of the muffler 51 are fixed to screw holes formed on the muffler 51 with screws and the like. Elongated holes, through which screws fixing the muffler 51 to the transmission case M are inserted, are formed in different orientations on the front bracket 58 and the rear bracket 59. By forming the orientations of the elongated holes this way, dimensional errors of the muffler 51, errors of mounting positioning, and the like are absorbed to facilitate mounting.

As described above, the upper frames 24, the mount frame 31, and the left and right vertical frames 32 are arranged in a manner that the rear end portion of the vehicle body frame F forms an inverted trapezoid as viewed from the rear. Then, the continuously variable transmission V is arranged in an inclined manner such that the upper portion of the continuously variable transmission V is displaced rightward. On the left side of the upper portion of the continuously variable transmission V, inside a corner portion on the left side of the upper portion of the inverted trapezoid, and in a vicinity of the lower side of the lateral frame 37, the muffler 51 is arranged. By doing so, the internal space of the vehicle body frame F can be effectively used. Further, as FIG. 7 illustrates, in plan view, the muffler 51 is arranged in a vicinity of the lateral frame 37 at a position overlapping the lower side of the lateral frame 37, and the muffler 51 is arranged at a position overlapping the upper side of the rear wheel drive shaft 62. As described above, the muffler 51 may also be arranged on the right side inside the vehicle body frame F. Also in such an arrangement, the muffler 51 is arranged at a position overlapping the upper side of the rear wheel drive shaft 62.

In particular, most of the upper surface of the muffler 51 is covered by the cover 50, and letters such as "HOT" (not illustrated in the drawings) are formed as projections by press working on the cover 50. Further, on the cover 50, by opening a portion of the letters and the like formed as projections by press working, rainwater and the like are unlikely to accumulate on the upper surface; and by forming convex-concave portions by press working, the surface area of the cover 50 is enlarged and a heat radiation effect is enhanced, and at the same time, strength is increased. The muffler 51 is fixedly connected to the rear end of the exhaust pipe 69. Even after the muffler 51 is attached to members in the vicinity of the transmission case M and the like, the exhaust pipe 69 and the muffler 51 are configured to be integrally detachable.

(Detachment of Drive Unit)

In the configuration as described above, by separating the drive unit C, together with the detachable frame unit G and the support frame 35, from the vehicle body frame F, and by separating the portion of the upper anti-vibration mount 48, the drive unit C can be detached in a form of being withdrawn downward.

Specifically, the whole vehicle body frame F is lifted up; then, by removing the insertion bolts 33S, the brackets 33A of the front frame 33 are separated from the main frames 21; by removing the connecting bolts 32S, the lower members 32B are separated from the upper members 32A, which constitute the left and right vertical frames 32 (separating the detachable frame unit G); and by removing the flange bolts 35S, the flange portions 35A on the two ends of the support frame 35 are separated from the main frames 21; and by separating the portion of the upper anti-vibration mount 48, the upper ends or rear ends of the rear suspension units 41 are separated.

By performing this separation, the engine E is in a state of being supported on the support frame 35 by the lower anti-vibration mounts 45, and the transmission case M is in a state of being supported on the mount frame 31 by the lower anti-vibration mounts 45. As FIG. 13 illustrates, the drive unit C, including the engine E, the transmission case M, and the continuously variable transmission V, can be integrally detached from the vehicle body frame F in a form of being moved downward. Further, the muffler 51 is provided in the drive unit C and the rear wheels 2 are supported on the left and right vertical frames 32 via the rear suspension arms 39. Therefore, these parts can also be detached downward together with the drive unit C.

In particular, the engine E, the transmission case M, and the continuously variable transmission V are heavy, and these members are detached from the vehicle body frame F in a form of being moved downward. Therefore, as compared to a case where these members are detached in a form of being lifted upward, detachment can also be performed in a form of using a hydraulic jack to lower these members down, for example, without the need for lifting equipment. Further, in this working vehicle, it is also possible to adopt a configuration in which the front frame 33 is not connected to the main frames 21. By adopting such a configuration, time and effort can be reduced when separating the mount frame 31.

(Speed Change Operation Structure)

As FIGS. 6, 7 and 9-11 illustrate, the engine E and a lower position of the transmission case M are connected, and a gap H is formed at an upper position between the two members. A coupling member 71 is arranged at a position straddling over the top of the gap H, crossing over an upper surface of a rear portion of the engine E and projecting portions Ma protruding upward from a front portion of the transmission case M. A front end of the coupling member 71 is bolt-connected to the engine E, and a rear end of the coupling member 71 is bolt-connected to the projecting portions Ma of the transmission case M. This connection enhances the coupling strength between the engine E and the transmission case M.

At an upper position of the coupling member 71, a tubular body 72 is provided coaxially with a middle axis X in a lateral orientation. A middle actuation shaft 73 is rotatably supported with respect to the tubular body 72 in a manner fitted therein. A middle position of a plate-shaped input arm 74 connects to an end portion on a right side of the middle actuation shaft 73. A bell-crank-shaped output arm 75 connects to an end portion on a left side of the middle actuation shaft 73. A neutral cam 76 connects to a middle portion of the middle actuation shaft 73.

An arm-shaped stay 77 is fixedly provided on the outside of the tubular body 72. An end portion of an outer wire 78A of an operation wire 78 is supported by the stay 77, the operation wire 78 as a first operation device being linked to the accelerator pedal 16 as a speed change operation tool. Further, an end portion of an inner wire 78B of the operation wire 78 connects to one end portion of the input arm 74. A speed control rod 79 connects to the other end portion of the input arm 74, the speed control rod 79 as a third operation device transmitting an actuating force of the input arm 74 to a throttle mechanism Et of the engine E.

A speed change operation part 80 is arranged on a left side surface of the continuously variable transmission V. A speed change operation arm 81A is provided for swinging a speed change operation shaft 81 that protrudes from the speed change operation part 80 in a horizontal orientation. The speed change operation arm 81A in a neutral orientation illustrated in FIG. 6 shuts off hydraulic oil supplied from the hydraulic pump 53 to the hydraulic motor 54 to stop traveling. By swinging the speed change operation arm 81A, the hydraulic oil supplied from the hydraulic pump 53 to the hydraulic motor 54 is increased and an increase in traveling speed is realized.

Figure 12:
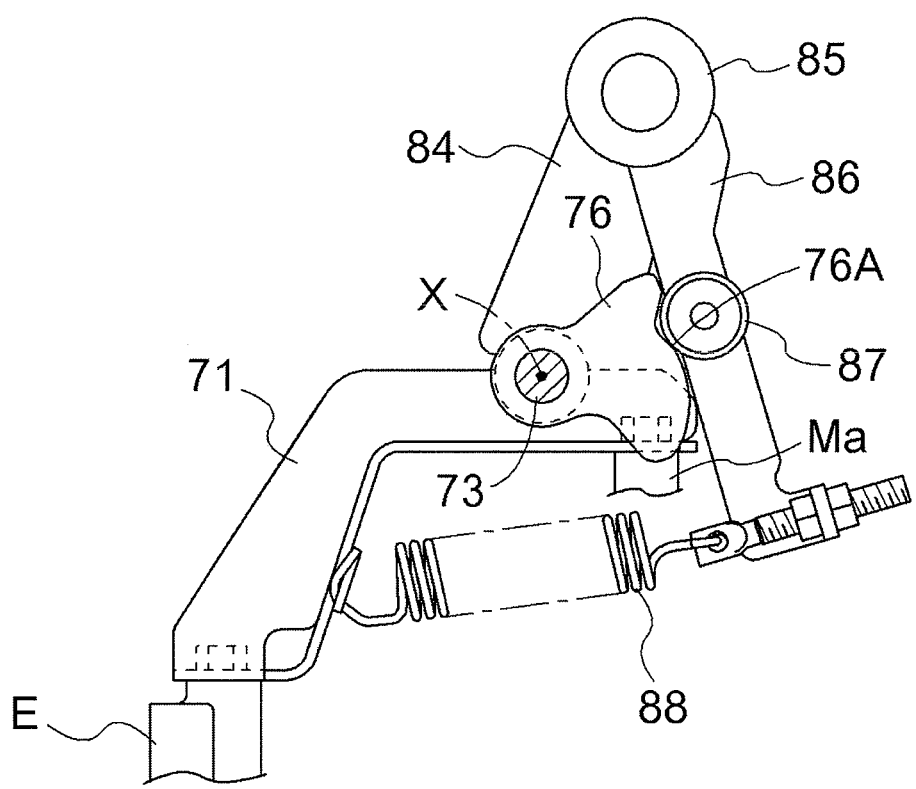
FIG. 12 is a side view of the speed change operation structure.

One end portion of an operation rod 82 connects to the speed change operation arm 81A, and the other end portion of the operation rod 82 connects to one arm of the output arm 75. An oil damper 83 for inhibiting rapid actuation of the speed change operation arm 81A connects to the other end portion of the output arm 75. As FIG. 12 illustrates, a concave cam surface 76A is formed on an outer periphery of the neutral cam 76. A neutral return arm 86 is supported on a support part 85 of a projecting end of an arm body 84 fixedly provided on the tubular body 72, in a manner swingable about an axis parallel to the middle axis X. An abutment member 87 formed from an idling roller engageable with the cam surface 76A of the neutral cam 76 is supported on the neutral return arm 86. A biasing force of a neutral return spring 88 acts on a swinging end of the neutral return arm 86.

According to this speed change operation structure, when the accelerator pedal 16 is depressed, the inner wire 78B is pulled, and the input arm 74 and the middle operation shaft 73 rotate about the middle axis X. Along with the rotation of the input arm 74, the speed control rod 79 is pulled, and, with this operation force, the throttle mechanism Et is operated in an acceleration direction and an engine rotation speed is increased. Further, the output arm 75 rotates integrally with the rotation of the middle operation shaft 73 caused by the depression operation of the accelerator pedal 16. By a pushing operation of the operation rod 82 linked to this rotation, the speed change operation arm 81A is operated in an acceleration direction and the continuously variable transmission V performs acceleration. That is, in conjunction with the depression operation of the accelerator pedal 16, traveling speed can be increased by increasing the driving speed of the continuously variable transmission V, while inhibiting engine stall by increasing the engine rotation speed.

Further, when the depression operation of the accelerator pedal 16 is released, the tension acting on the inner wire 78B from the accelerator pedal 16 is largely reduced. Due to the biasing force of the neutral return spring 88 that acts on the neutral return arm 86, the abutment member 87 presses against and enters into the cam surface 76A of the neutral cam 76. Thereby, the middle operation shaft 73 returns to a neutral position and the speed change operation arm 81A returns to the stop position; in addition, the throttle mechanism Et also returns to a deceleration position, and the traveling vehicle body A stops.

Specifically, in this speed change operation structure, the operation wire 78 as the first operation device transmitting the depression operation force of the accelerator pedal 16 is arranged on the right side of the vehicle body. The operation rod 82 as the second operation device transmitting the operation force of the operation wire 78 to the speed change operation part 80 on the left side of the continuously variable transmission V is arranged on the left side of the vehicle body. The speed control rod 79 as the third operation device transmitting the speed change operation force of the operation wire 78 to the throttle mechanism Et on the right side of the engine E is arranged on the right side of the vehicle body. From this arrangement, using a configuration in which the middle operation shaft 73 rotates about the middle axis X, the speed change operation is performed by effectively utilizing the spaces on the two sides of the drive unit C. In this speed change operation structure, it is also possible that the operation wire 78 as the first operation device, and the like, are arranged on the left side of the vehicle body, and the operation rod 82 as the second operation device, and the like, are arranged on the right side of the vehicle body. Further, an operation system operating the throttle mechanism Et may be arranged on either the left or right side of the vehicle body.

(Operation Effect of the Embodiment)

In this working vehicle, the drive unit C is configured by integrally connecting the engine E, the transmission case M, and the continuously variable transmission V, and the engine E and the transmission case M are supported by the left and right lower anti-vibration mounts 45 on the underframe UF. Therefore, it becomes possible for the weight of the drive unit C to be received by the lower anti-vibration mounts 45. Further, the upper portion of the transmission case M is supported by the upper anti-vibration mount 48 on the middle portion of the lateral frame 37, the two ends of which are supported by the upper frames 24. Therefore, even when the distance in the lateral width direction between the left and right lower anti-vibration mounts 45 is short, it is possible to inhibit vibration of the upper portion of the drive unit C, thereby realizing support with superior anti-vibration capability.

By arranging the continuously variable transmission V in an inclined manner such that the upper portion of the continuously variable transmission V is displaced toward one side in the lateral direction of the traveling vehicle body A, the space on the other side of the continuously variable transmission V in the lateral direction of the vehicle body is enlarged. Therefore, even when the space in which the continuously variable transmission V is arranged is relatively narrow, the muffler 51 can be arranged inside this space. Further, the engine E is arranged at a front position of the transmission case M in a manner deviated to one side (left side) with respect to the transmission case M; the exhaust manifold 68 is formed on one side (left side) on an upper portion of the engine E; and the muffler 51 is arranged in the same direction as the deviation of the engine E. Therefore, the exhaust pipe 69 can be linearly formed to linearly supply engine exhaust gas to the muffler 51, which simplifies the configuration of the exhaust system.

Further, as viewed in the longitudinal direction, a space of an inverted trapezoid shape is formed inside the vehicle body frame F, the inverted trapezoid shape being formed from the pair of left and right upper frames 24, the left and right vertical frames 32 in inclined orientations, and the underframe UF. Inside this space of the inverted trapezoid shape in the vehicle body frame F, the muffler 51 is arranged at a position in the vicinity of an upper left or right corner. Thus, the muffler 51 can be arranged at a corner of the vehicle body frame F in a state of being protected by the vehicle body frame F.

As described above, as viewed in the longitudinal direction, the vehicle body frame F is formed in a shape of an inverted trapezoid. By supporting the upper ends of the rear suspension units 41 on the lateral frame 37 that connects the left and right upper frames 24, it is possible for the orientations of the rear suspension units 41 to be close to orientations parallel to the swing directions of the rear suspension arms 39 (orientations perpendicular to arm surfaces of the rear suspension arms 39), so that low-impact compression of the rear suspension arms 39 can be performed.

The drive unit C and a support system of the rear wheels 2 are supported by the detachable frame unit G. Therefore, by separating the detachable frame unit G from the vehicle body frame F, the engine E, the transmission case M, the continuously variable transmission V, the muffler 51, and the rear wheels 2 can be integrally detached from the vehicle body frame F in a form of being withdrawn downward, and, for example, as compared to a configuration in which the drive unit C is withdrawn upward, the maintenance of the drive unit C becomes easy.

That is, the transmission case M is supported on the mount frame 31 by the lower anti-vibration mounts 45; the rear suspension arms 39 are swingably supported on the vertical frames 32 connected to the mount frame 31; and the rear wheels 2 are supported on the rear suspension arms 39. Further, the engine E is supported on the support frame 35 by the lower anti-vibration mounts 45. From this configuration, by separating the vertical frames 32 and separating the support frame 35 from the main frames 21, the engine E, the transmission case M, the continuously variable transmission V, the rear suspension arms 39, and the muffler 51 can be integrally detached in a form of being withdrawn downward, without the need of separating the drive system that transmits the driving force from the transmission case M to the rear wheels 2, and thus the operation for the separation is simplified.

The engine E and the transmission case M are connected at lower portions thereof. The upper portion of the engine E and the upper portion of the transmission case M are connected by the coupling member 71, which is arranged at a position straddling over the gap H formed by the upper portions, to enhance the coupling strength. Further, the middle operation shaft 73 is rotatably supported by the tubular body 72, which is provided in a lateral orientation with respect to the coupling member 71. The operation force of the accelerator pedal 16 is transmitted to one side (right side) of the middle operation shaft 73 to rotate the middle operation shaft 73. From the other side (left side) of the middle operation shaft 73, the speed change operation arm 81A of the continuously variable transmission V is operated to perform speed change. In such a configuration, without causing mechanical backlash and play at the middle operation shaft 73, a speed change operation force is transmitted with high precision from one side of the drive unit C to the continuously variable transmission V on the other side to realize speed change operation.

In particular, when performing the speed change operation, by simultaneously operating the continuously variable transmission V and the throttle mechanism Et of the engine E, acceleration is realized without causing an engine stall. When the operation of the accelerator pedal 16 is released, the abutment member 87 formed from the idling roller engages with the cam surface 76A of the neutral cam 76. Thereby, the middle operation shaft 73 is rotated toward a neutral direction, and the continuously variable transmission V returns to the neutral position. At the same time, by operating the throttle mechanism Et to the deceleration position, a stop to the traveling is realized.

Other Embodiment

Figure 15:
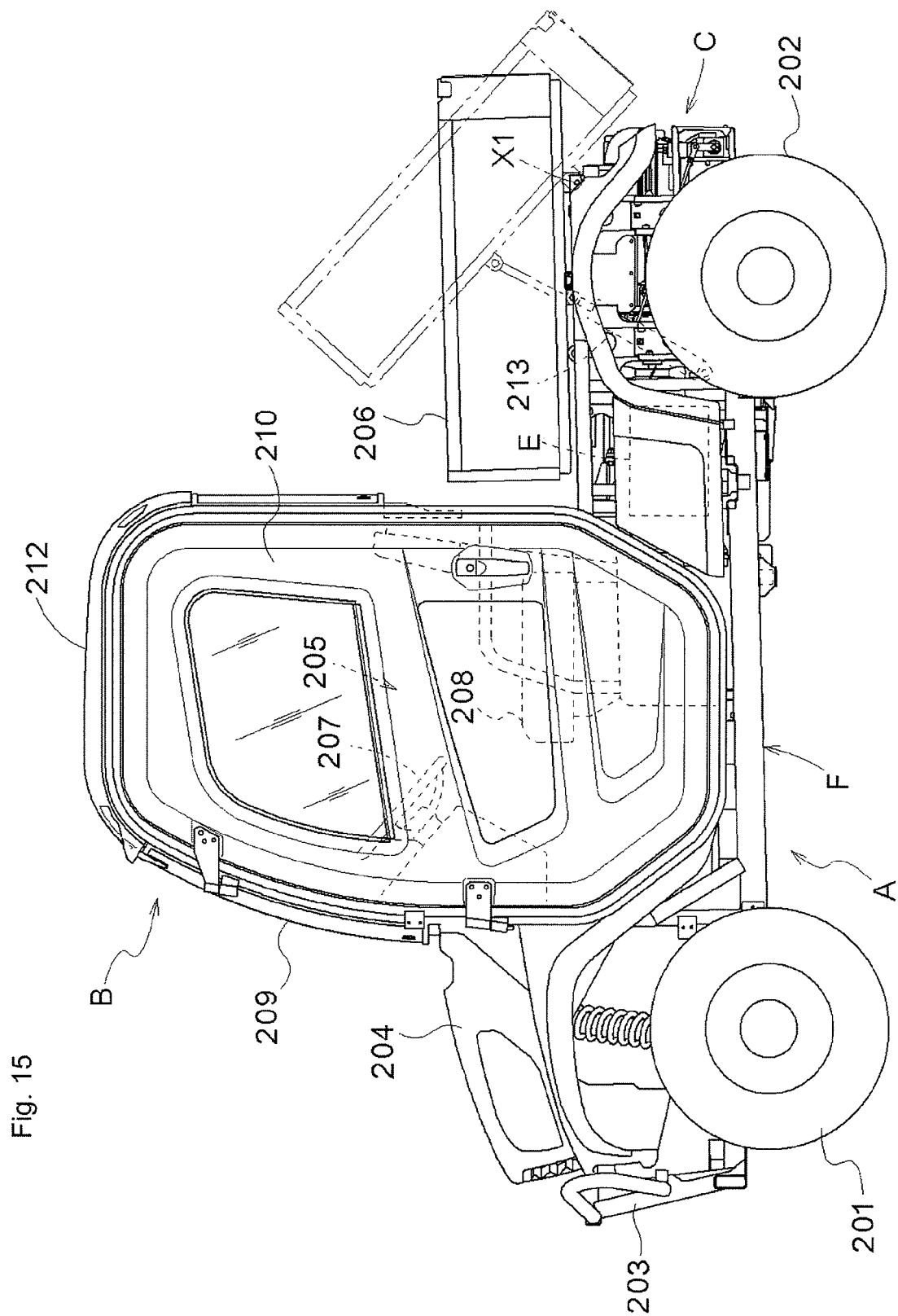
FIG. 15 is a side view illustrating a working vehicle of the other embodiment.
Figure 16:
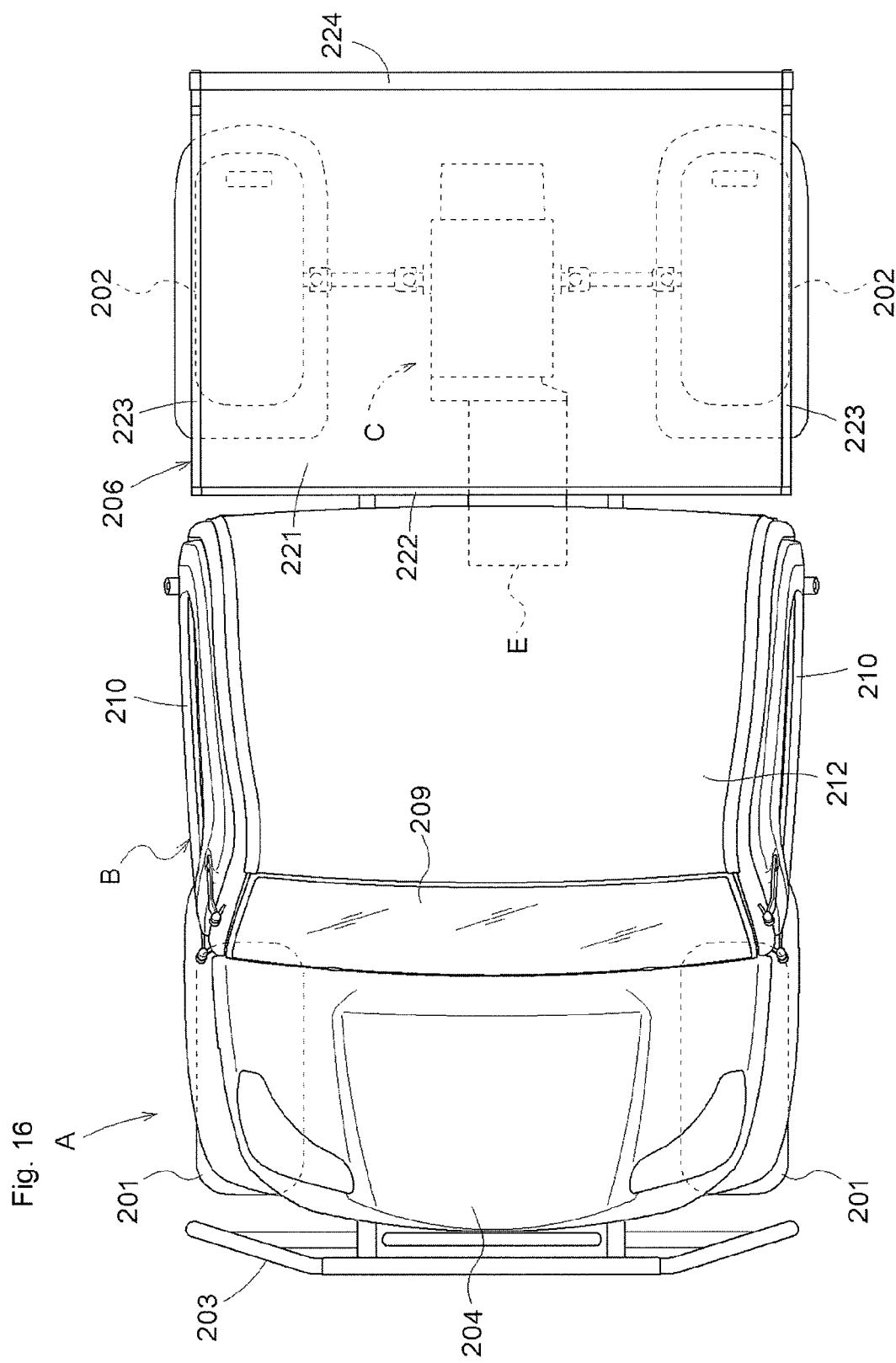
FIG. 16 is a plan view illustrating the working vehicle of the other embodiment.
Figure 17:
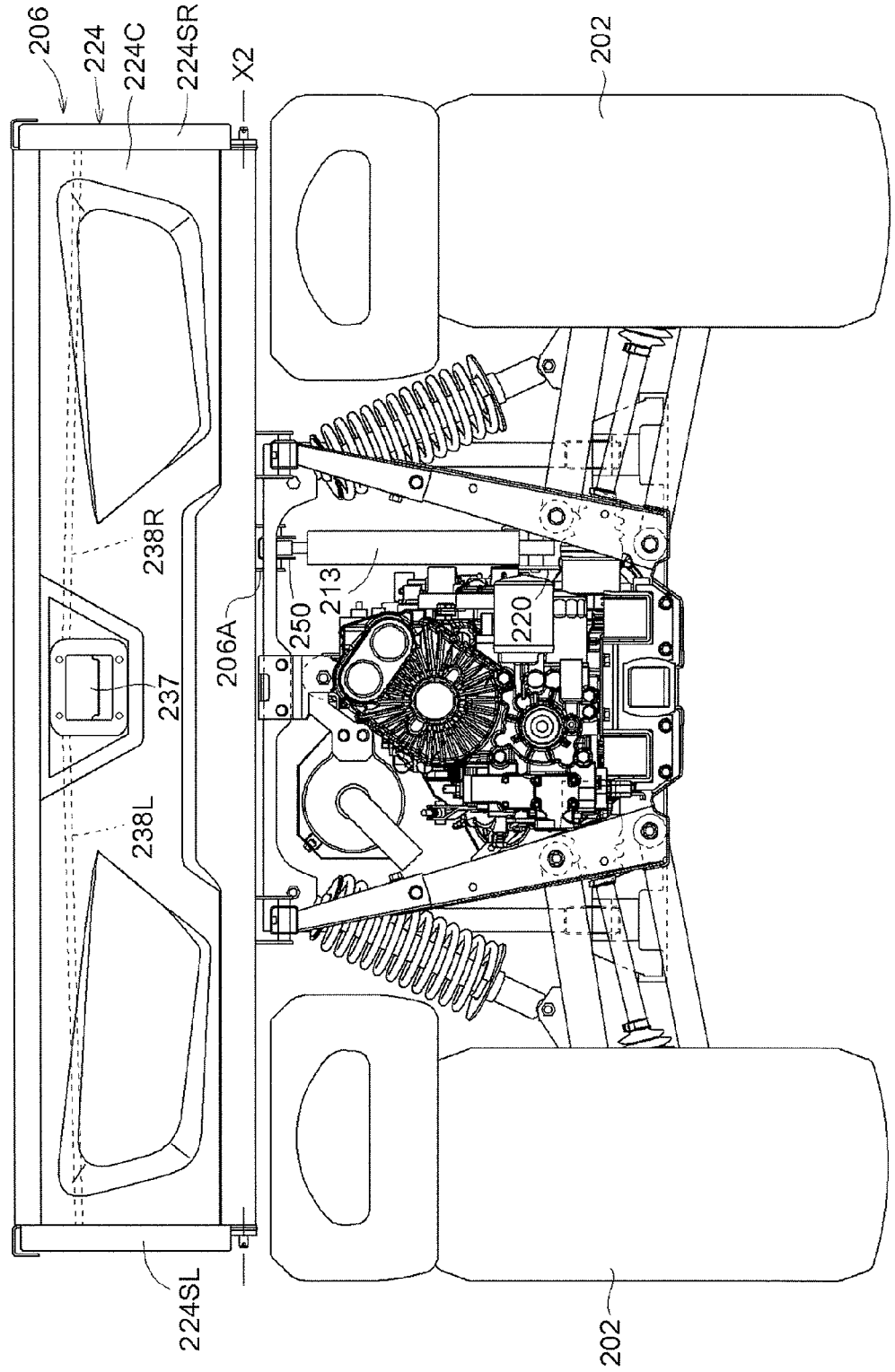
FIG. 17 is a rear view illustrating the working vehicle of the other embodiment.

In the following, another embodiment for carrying out the present invention is explained with reference to the drawings. An external view of a working vehicle according to the present invention is illustrated in FIGS. 15-17. The working vehicle is provided with a traveling vehicle body A supported by a pair of freely steerable left and right front wheels 201 and a pair of left and right rear wheels 202; a front guard 203 and a hood 204 at a front portion of the traveling vehicle body A; a cabin B constituting an operating unit 205 at a central part of the traveling vehicle body A; a cargo bed 206 at a rear portion of the traveling vehicle body A; and a drive unit C containing an engine E at a position below the cargo bed 206.

In the operating unit 205, a steering handle 207 steering the front wheels 201 and a seat 208 are provided. A windshield 209 is provided at a front portion of the cabin B. Doors 210 for getting in and out are provided on a right portion and a left portion of the cabin B. A roof 212 is mounted above the cabin B.

This working vehicle is configured to be of a four-wheel drive type that has a travel drive system transmitting a driving force from the drive unit C to the front wheels 201 and the rear wheels 202, and can be used for multipurpose work such as agricultural work and transportation work. The cargo bed 206 is supported in a manner swingable about a laterally oriented axis X1 arranged at a rear end vicinity of the traveling vehicle body A. A front end side of the cargo bed 206 is operated to move up and down by actuation of a hydraulic dump cylinder 213.

Figure 18:
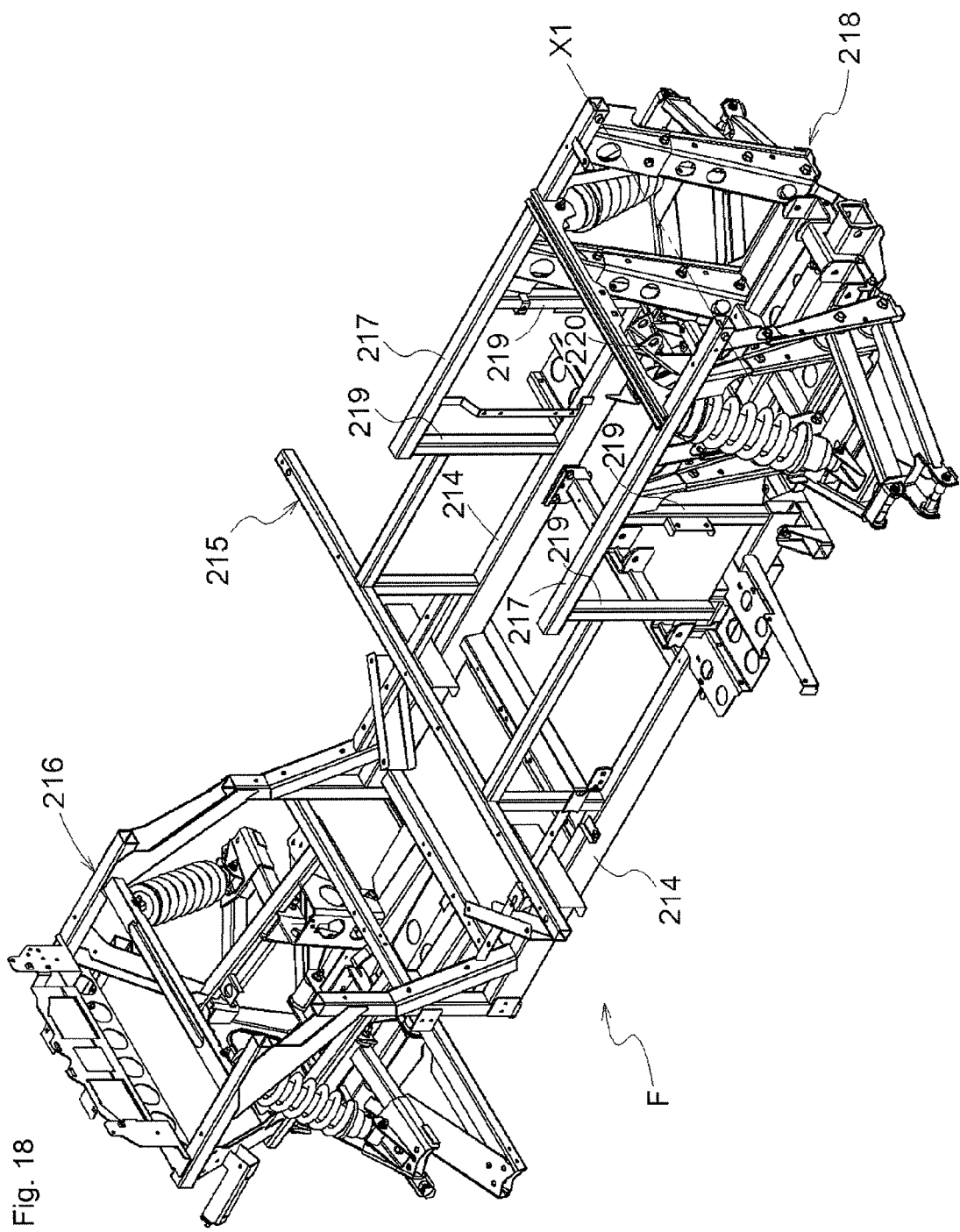
FIG. 18 is a perspective view illustrating a vehicle body frame of the working vehicle of the other embodiment.

The traveling vehicle body A is provided with a vehicle body frame F as a strength member. As FIG. 18 illustrates, the vehicle body frame F is configured to include a pair of left and right main frames 214 extending in a longitudinal direction; a cabin frame unit 215 supporting the cabin B at a front position of the main frames 214; a front frame unit 216 connecting front ends of the main frames 214; upper frames 217 located at positions above a rear position of the main frames 214 and extending in the longitudinal direction of the traveling vehicle body A in a manner parallel to the main frames 214; and a frame unit 218 supporting the drive unit C at a rear position of the main frames 214. The left and right main frames 214 and the upper frames 217 are connected by vertically oriented connecting frames 219, and the laterally oriented axis X1 of the cargo bed 206 is provided at the rear end vicinity of the upper frames 217.

(Schematic Configuration of Cargo Bed)

Figure 19:
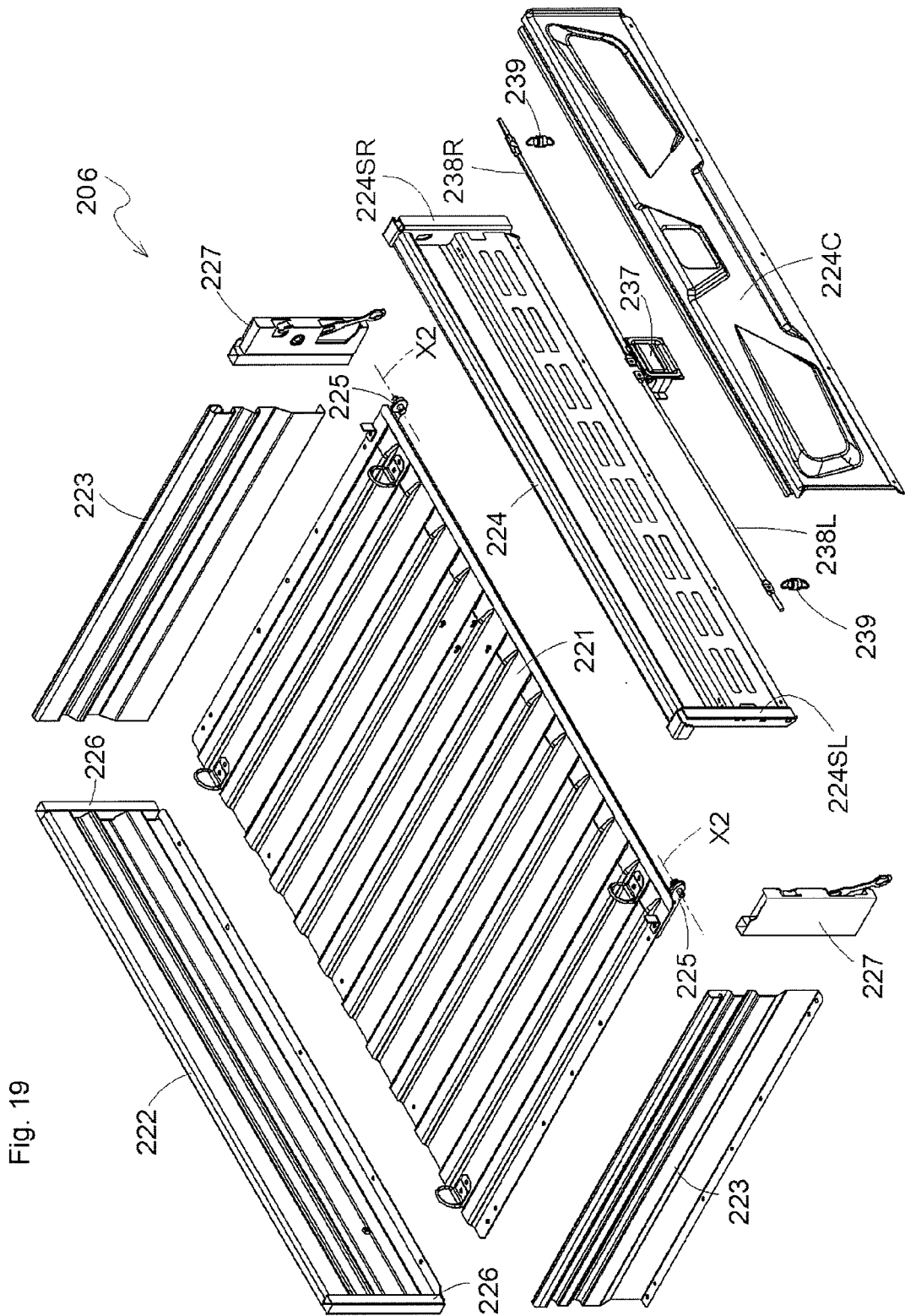
FIG. 19 is an exploded perspective view illustrating a cargo bed of the working vehicle.

As FIG. 19 illustrates, the cargo bed 206 is provided with a floor panel 221, a front panel 222, left and right side panels 223, and an openable and closable rear gate 224. The front panel 222 and the left and right side panels 223 are connected to the floor panel 221. The rear gate 224 is supported in a manner swingable about a laterally oriented axis X2 arranged at a rear end vicinity of the floor panel 221. More specifically, at left and right rear end vicinities of the floor panel 221, a pair of plate-shaped brackets 225 are mounted (see also FIG. 22). The rear gate 224 is pivotally supported by the laterally oriented axis X2 provided on the rear ends of the plate-shaped brackets 225. Chassis-like rear end members 227 extending in a vertical direction are fixed by welding to rear ends of the left and right side panels 223.

Figure 20:
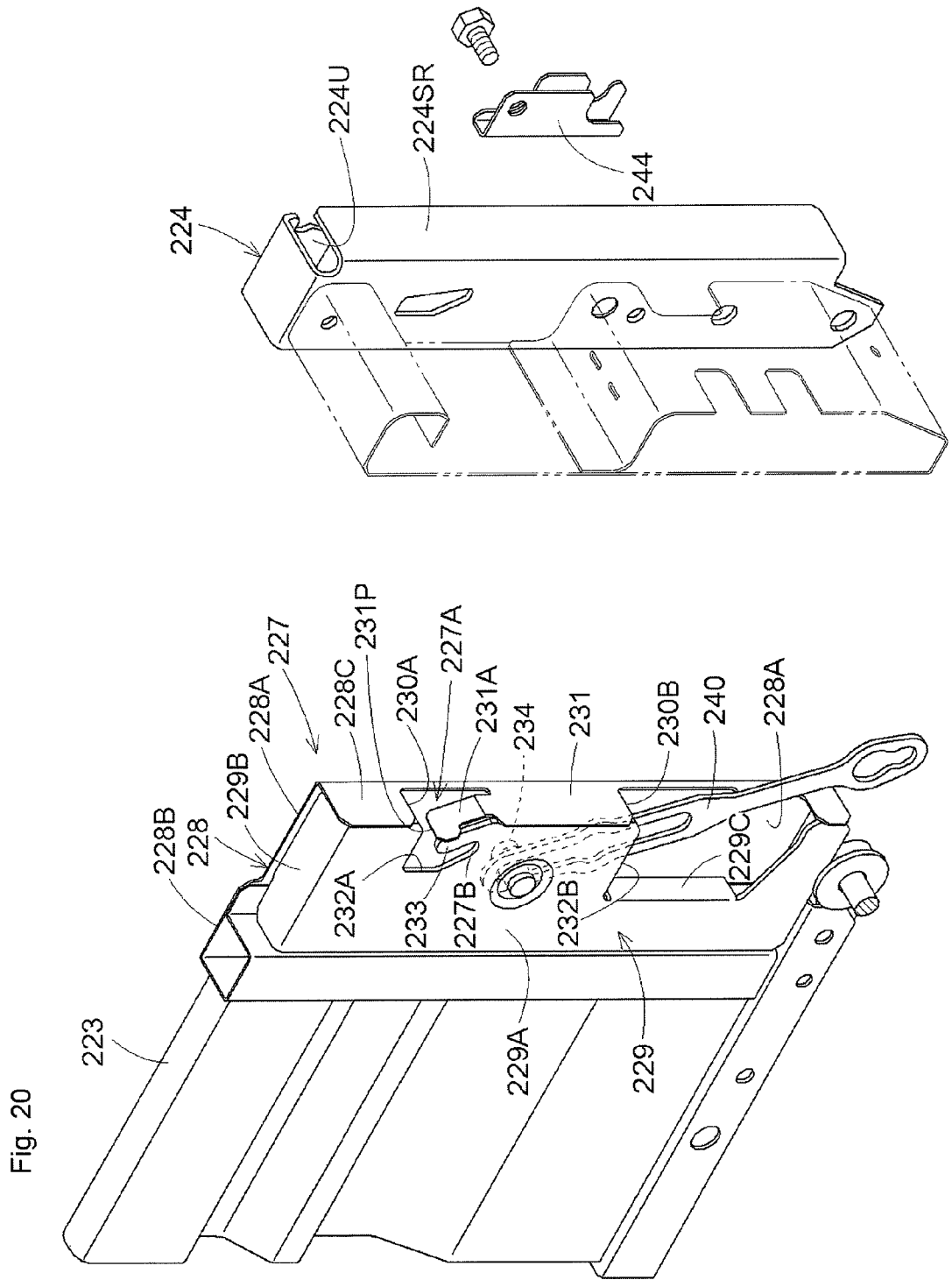
FIG. 20 is a perspective view illustrating a rear end member of a side panel.
Figure 21:
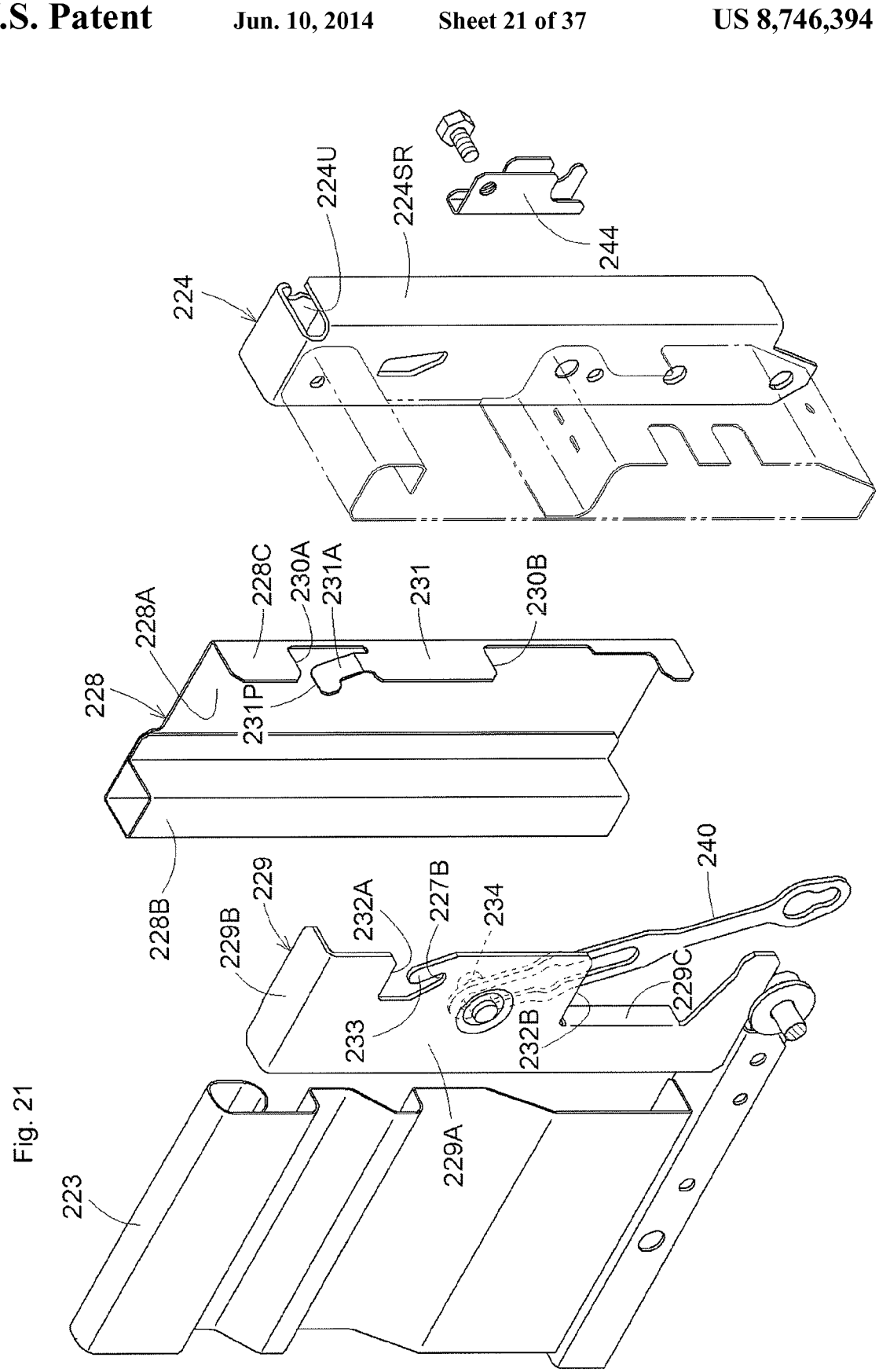
FIG. 21 is an exploded perspective view illustrating the rear end member.

As FIG. 20 illustrates, the rear end members 227 are each formed from an outer end body 228 and an inner end body 229, which are fixed to each other by welding. As FIGS. 20 and 21 illustrate, the outer end body 228 has a main plate portion 228A extending in the longitudinal direction of the traveling vehicle body A, a square pipe portion 228B arranged at a front end of the main plate portion 228A, and a rear end plate portion 228C formed by bending a rear end of the main plate portion 228A toward the inner side. The square pipe portion 228B is formed by continuously bending the front end of the main plate portion 228A toward the inner side, and has a generally square cross-sectional shape in a plan view and a hollow interior. The rear end members 227 are fixed by welding to rear end surfaces of the side panels 223 via front end surfaces of the square pipe portions 228B.

The inner end body 229 has a main plate portion 229A extending in the longitudinal direction of the traveling vehicle body A, and an upper end plate portion 229B extending from an upper end of the main plate portion 229A toward the outside. The outer end body 228 and the inner end body 229 are fixed to each other by welding in a state in which the upper end plate portion 229B of the inner end body 229 is in contact with an inner surface of an upper end of the main plate portion 228A of the outer end body 228, and a front end surface of the main plate portion 229A of the inner end body 229 is in contact with the square pipe portion 228B of the main plate portion 228A. This allows a space located between the rear end plate portion 228C of the main plate portion 228A and the square pipe portion 228B of the main plate portion 228A to be closed by the inner end body 229 to form a chassis of a generally rectangular parallelepiped shape in the space.

On the rear end plate portion 228C of the outer end body 228, two rectangular cutout portions 230A and 230B are formed in a state being spaced apart in the vertical direction. A forwardly inclined guide plate 231P integrally extends from an upper end of a rectangular end surface formation site 231 left between the two cutout portions 230A and 230B.

Also on the main plate portion 229A of the inner end body 229, two cutout portions 232A and 232B are formed in a state being spaced apart in the vertical direction. A tongue-shaped regulatory plate 233 having a rounded front end is formed projecting obliquely forward and upward from the rear of a lower end of the upper cutout portion 232A. A rear end surface of the regulatory plate 233 is made capable of supporting the guide plate 231P from the front side. Further, a pivot pin 234 for pivotally supporting a gate hanger 240 (an example of a link member), which will be described later, is erected from an inner surface of the main plate portion 229A of the inner end body 229 toward the outside.

As FIG. 20 illustrates, the upper cutout portion 230A of the outer end body 228 and the upper cutout portion 232A of the inner end body 229 coactively form an opening 227A receiving an other end vicinity of rods 238L and 238R, which will be described later. Further, a lowermost end portion of the cutout portion 232A, that is, a site in front of a base end portion of the regulatory plate 233, forms an engagement portion 227B that at least captures the other end vicinity of the rods 238L and 238R from the rear side. The engagement portion 227B is formed in a shape communicating with the opening 227A.

When the rear gate 224 is in a closed position, end bodies 224SL and 224SR that are provided on left and right end portions of the rear gate 224 and extend in the vertical direction overlap with the rear end members 227 of the side panels 223, and catch portions 224U that extend downward from the outsides of upper ends of the end bodies 224SL and 224SR are in a state of wrapping around upper ends of the rear end members 227 from lateral sides.

(Configuration of Lock Mechanism)

Figure 24:
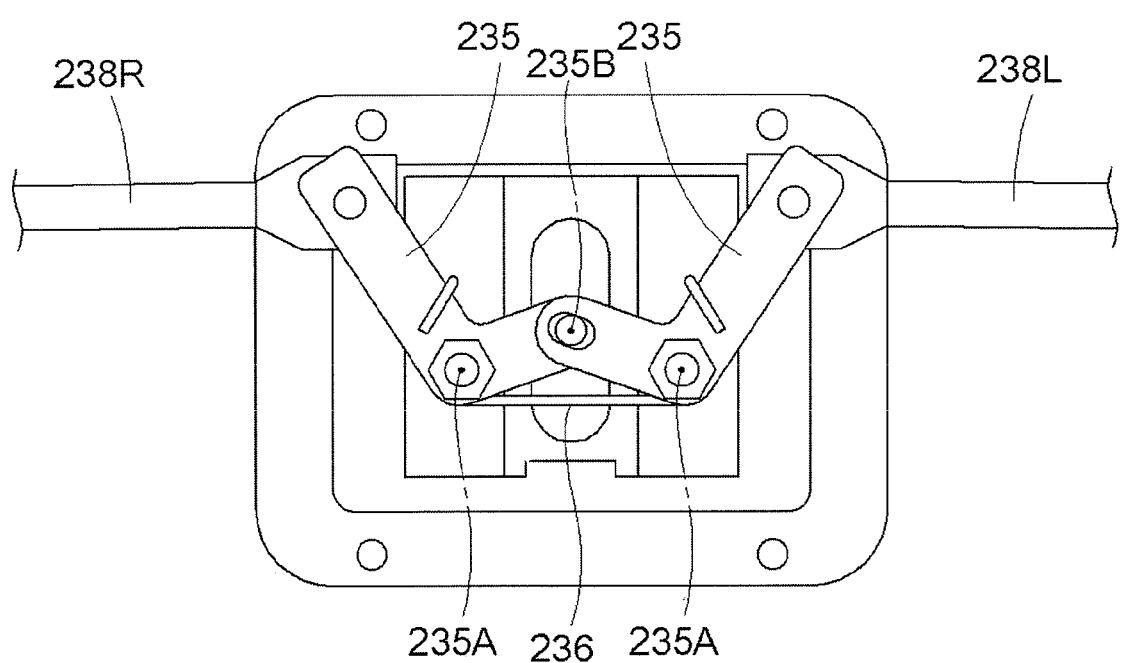
FIG. 24 is a rear view illustrating a vicinity of a lock arm.
Figure 25:
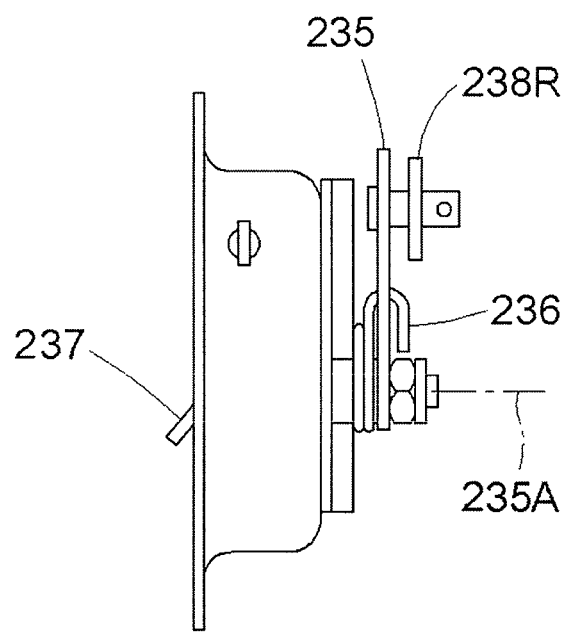
FIG. 25 is a side view illustrating the vicinity of the lock arm.

A lock mechanism is provided between the rear gate 224 and the side panels 223 for keeping the rear gate 224 in the closed position closing the rear end vicinity of the left and right side panels 223. As FIG. 23 illustrates, the lock mechanism includes a pair of left and right L-shaped lock arms 235 provided on a rear surface of the rear gate 224 in a vicinity of a lateral center in a manner swingable about longitudinally oriented axes 235A, and a pair of left and right rods 238L and 238R each having one end pivotally supported by a free end on an outer side of the lock arms 235 and the other end extending outward in the vehicle width direction. Free ends on an inner side of the lock arms 235 are pivotally supported about an axis 235B via a pin inserted through elongated holes formed on the free ends on the inner side. Further, as FIGS. 24 and 25 illustrate, the lock mechanism is provided with a spring 236 biasing in a direction of separating the free ends on the outer sides of the lock arms 235 away from each other. Further, as FIG. 23 illustrates, the lock mechanism is provided with a lock release handle 237 for manually allowing the free ends on the outer sides of the lock arms 235 to come close to each other against the biasing force of the spring 236. The lock release handle 237 is pivotally supported about a laterally oriented axis. When an lower end of the lock release handle 237 is swingably operated to be pulled and raised, the free ends on the inner side of the lock arms 235, together with the axis 235B, are pushed down. Therefore, the free ends on the outer sides of the lock arms 235 are operated to come close to each other, and the rods 238L and 238R are pulled toward the laterally central side. In FIG. 24, illustration of the lock release handle 237 is omitted.

Further, as FIG. 23 illustrates, between positions slightly more on the central side than the other ends of the rods 238L and 238R and a main body of the rear gate 224, a pair of coil springs 239 are provided biasing the other end vicinities of the rods 238L and 238R downward. Upper ends of the coil springs 239 are engaged by through holes formed on the other end vicinities of the rods 238L and 238R, and lower ends of the coil springs 239 are engaged by through holes formed on a panel that forms a rear surface of the rear gate 224. As FIG. 23(b) illustrates, in a state in which the rods 238L and 238R are pulled to the laterally central side by the lock release handle 237, the coil springs 239 are in inclined states in which the upper ends of the coil springs 239 are moved toward the inside, and thereby, the coil springs 239 bias the rods 238L and 238R laterally toward the outside. Therefore, similar to the spring 236, the coil springs 239 also bias in the direction of separating the free ends of the lock arms 235 away from each other.

FIG. 23(a) illustrates a locked state in which the other ends of the pair of left and right rods 238L and 238R, which are biased to project toward the outside beyond left and right end surfaces of the rear gate 224 in the closed position, enter the openings 227A of the rear end members 227 and are captured from the rear side by the engagement portions 227B. That is, in a state in which an external force is not applied on the lock arms 235 via the lock release handle 237, the other ends of the pair of left and right rods 238L and 238R are biased by the spring 236 and the like to project toward the outside beyond the left and right end surfaces of the rear gate 224.

Figure 26A:
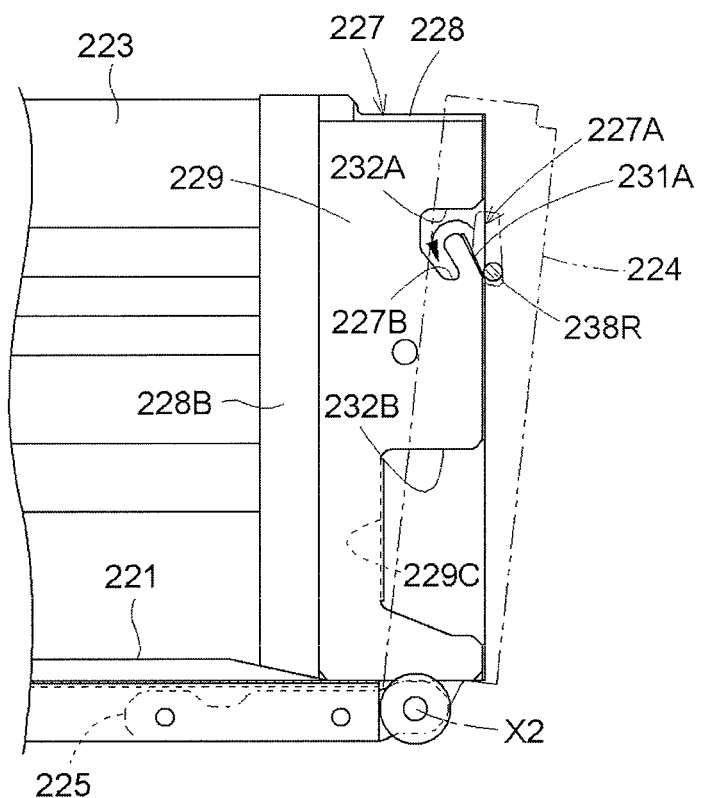
FIGS. 26($a$) and 26($b$) are side views illustrating an operation of the lock mechanism.
Figure 26B:
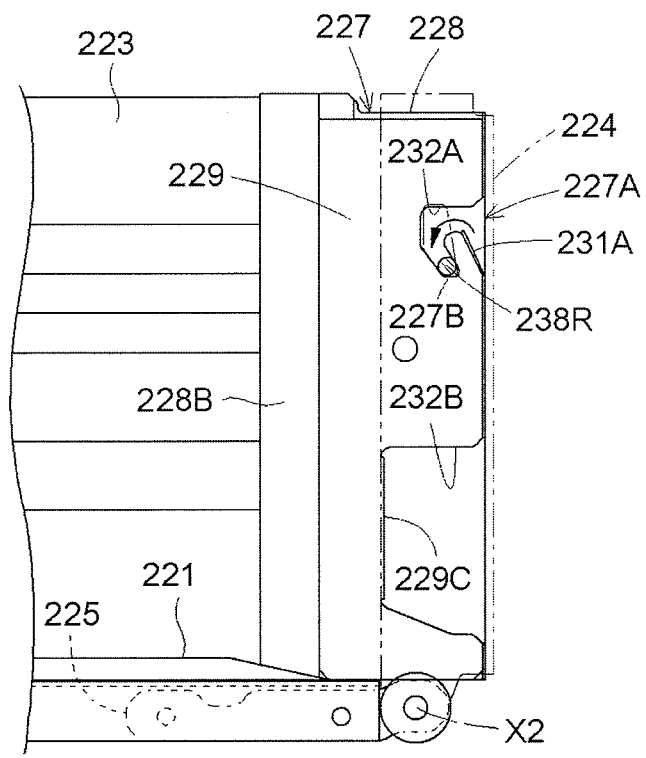

As FIG. 26(a) illustrates, when the rear gate 224 is swingably operated to move from an opened position to the closed position, the other ends of the rods 238L and 238R projecting from the rear gate 224 more into the left and right enter the openings 227A and starts contacting the guide plates 231P of the left and right side panels 223. The other ends of the rods 238L and 238R are operated to move upward via the inclined rear surfaces 231A of the guide plates 231P against the biasing force of the coil springs 239. When finally the other ends of the rods 238L and 238R move over upper ends of the rear surfaces 231A, as FIG. 26(b) illustrates, the other ends of the rods 238L and 238R are housed by the engagement portions 227B located in front of and below the regulatory plates 233 by the biasing forces of the coil springs 239, and are captured in the same places. Thus, locking of the rear gate 224 is realized.

Next, as FIG. 23(b) illustrates, in the state in which the rear gate 224 is locked at the closed position, when the lock release handle 237 is pulled and raised against the biasing force of the spring 236 and the like, the free ends of the lock arms 235 are swingably operated to come close to each other, and the other ends of the rods 238L and 238R are withdrawn from the openings 227A toward the inside and are released from being captured by the engagement portions 227B. Therefore, the rear gate 224 can be opened. As FIG. 19 illustrates, members of the lock mechanism, except the lock release handle 237, are covered by a cover member 224C that constitutes a rear surface cover of the rear gate 224.

(Configuration of Hanging Mechanism)

Figure 27A:
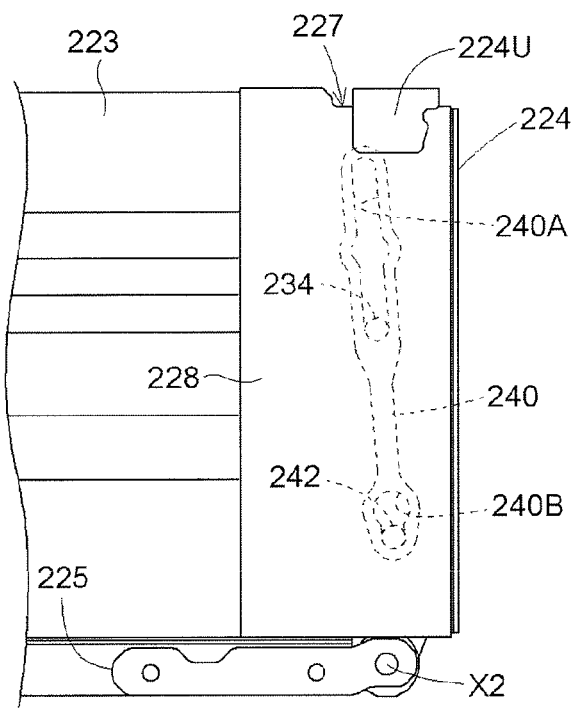
FIGS. 27($a$) and 27($b$) are side views illustrating an operation of a hanging mechanism.
Figure 27B:
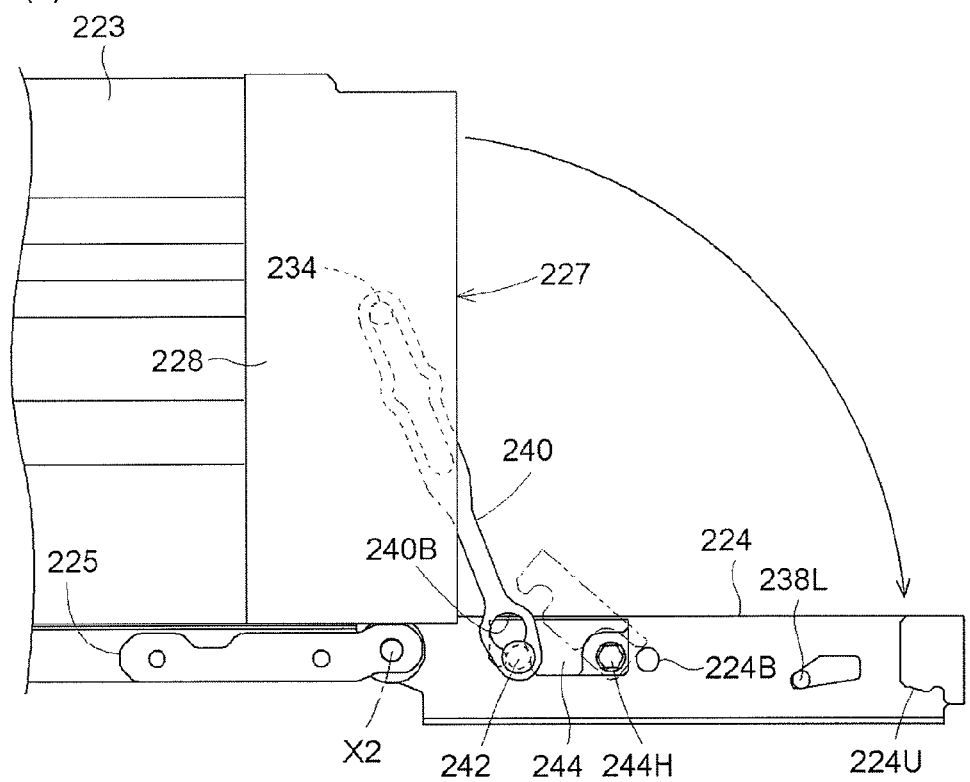

When the rear gate 224 after unlocking is gradually opened downward from the closed position illustrated in FIG. 27(a), as FIG. 27(b) illustrates, the rear gate 224 is automatically kept, by a hanging mechanism provided between the left and right side panels 223 and the rear gate 224, at an intermediate position at which the rear gate 224 is opened about 90 degrees from the closed position so that an inner surface of the rear gate 224 is substantially horizontal. The hanging mechanism has the pair of left and right elongated gate hangers 240 (examples of link members) pivotally supported by the pivot pins 234 of the left and right side panels 223, and a pair of left and right shaft members 242 arranged projecting laterally outward from the rear gate 224.

Figure 28:
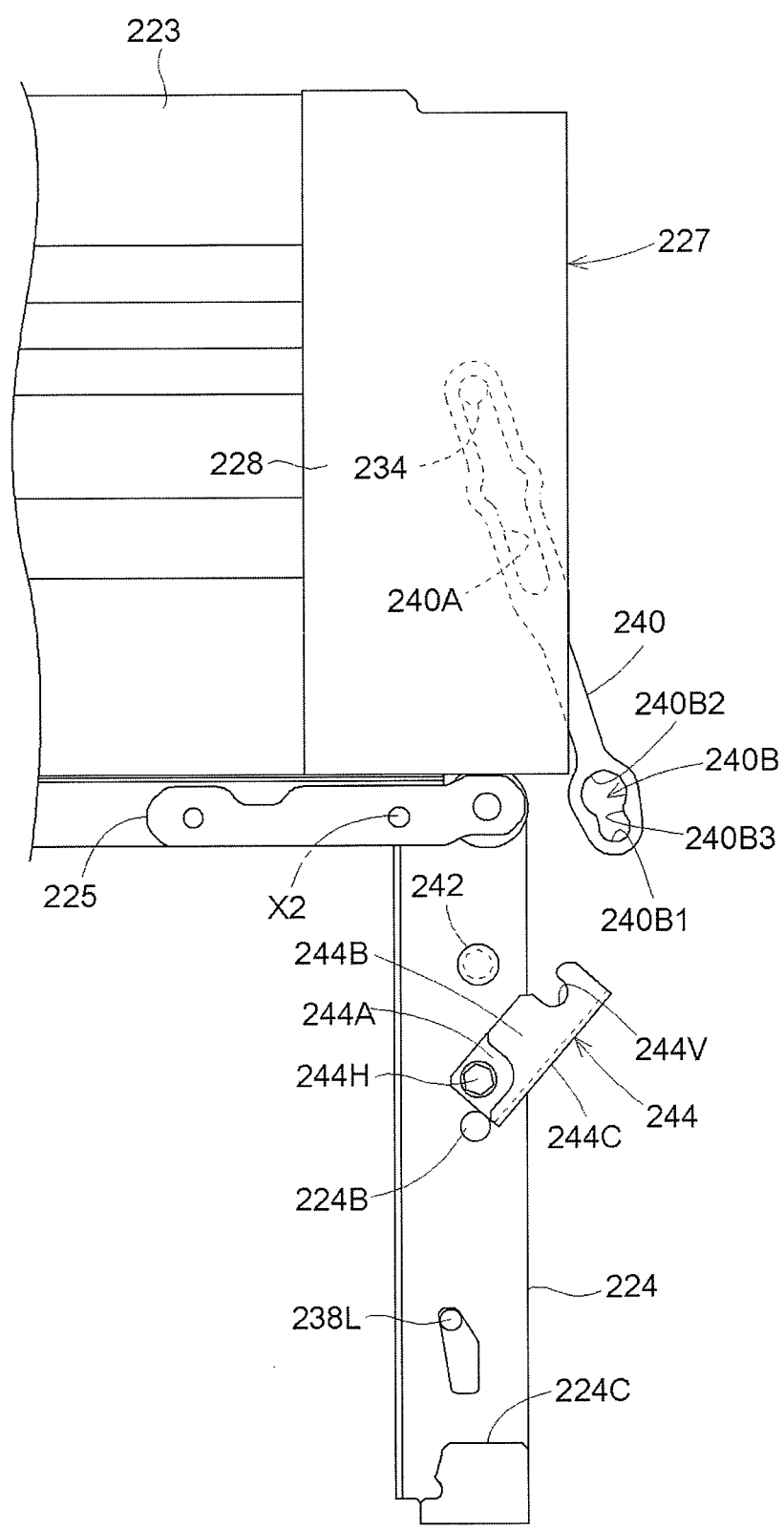
FIG. 28 is another side view illustrating the operation of the hanging mechanism.

The gate hangers 240 are pivotally supported by the pivot pins 234 via long holes 240A formed on upper end sides of the gate hangers 240. On the other hand, through holes 240B are formed on lower end sides of the gate hangers 240. The shaft members 242 of the rear gate 224 can be manually engaged and disengaged from the through holes 240B. FIG. 28 illustrates a state in which the lower end sides of the gate hangers 240 are manually disengaged from the shaft members 242.

As FIG. 28 illustrates, each of the through holes 240B includes a lower first hole portion 240B1 and an upper second hole portion 240B2, which are in communication with each other via a narrow portion 240B3. The upper second hole portion 240B2 has a sufficiently larger inner diameter than the lower first hole portion 240B1. In order to configure the narrow portion 240B3, a shortest distance between mutually opposing protruding portions is configured to be smaller than the first hole portion 240B1.

Figure 29:
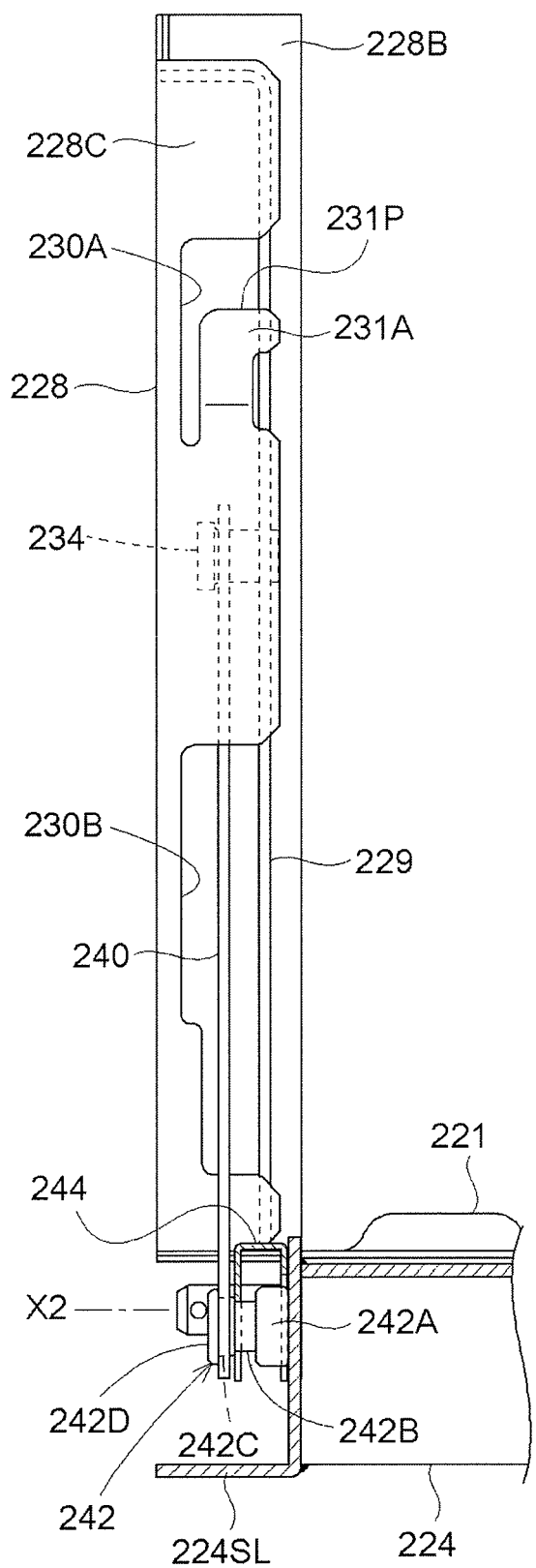
FIG. 29 is a rear view illustrating an operation of a retaining member of the hanging mechanism.

As FIG. 29 illustrates, each of the shaft members 242 includes a base end portion 242A, which is formed from a solid cylinder body and is fixed on a lateral side of each of the left and right side panels 223; a detachment shaft portion 242B, which extends adjacent to a front end side of the base end portion 242A; an engagement shaft portion 242C, which extends adjacent to a front end side of the detachment shaft portion 242B; and a circular-plate-shaped retainer head 242D, which extends adjacent to a front end side of the engagement shaft portion 242C.

The engagement shaft portion 242C has an outer diameter larger than the width of the narrow portion 240B3 and smaller than the inner diameter of the first hole portion 240B1. The detachment shaft portion 242B has an outer diameter smaller than the width of the narrow portion 240B3. The base end portion 242A and the retainer head 242D have diameters larger than the inner diameter of the first hole portion 240B1. In particular, the retainer head 242D has an outer diameter smaller the inner diameter of the second hole portion 240B2.

Usually, as FIG. 29 illustrates, the gate hangers 240 are pivotally supported in a state in which the first hole portion 240B1 of each of the gate hangers 240 is engaged by the engagement shaft portion 242C of the shaft member 242 in a form being externally fitted to the engagement shaft portion 242C. Therefore, as described above, when the rear gate 224 is gradually opened downward, at the point when the pivot pins 234 of the left and right side panels 223 become in contact with the upper ends of the long holes 240A of the gate hangers 240, the opening of the rear gate 224 is regulated, and, as FIG. 27(b) illustrates, the rear gate 224 is kept at the intermediate position at which the inner surface of the rear gate 224 is substantially horizontal.

Here, by moving the lower end vicinity of the gate hanger 240 toward the inside, the first hole portion 240B1 is positioned to coincide with the detachment shaft portion 242B of the shaft member 242. In such a state, when the rear gate 224 is slightly moved back toward the closed position, the detachment shaft portion 242B passes through the narrow portion 240B3 and enters the second hole portion 240B2. Next, when the lower end vicinity of the gate hanger 240 is moved toward the outside, the second hole portion 240B2 is released from the retainer head 242D to the outside. Thereby, the gate hanger 240 is released from the shaft member 242. In such a state, the rear gate 224 can be opened to a position below the horizontal position.

(Configuration of Retaining Member)

Further, as FIGS. 27(b), 28, and 29 illustrate, a hanging mechanism is provided with a plate-shaped retaining member 244 for preventing the gate hanger 240 from being accidentally moved from the engagement shaft portion 242C to the detachment shaft portion 242B. The retaining member 244 is formed by bending a plate material in such a manner that a cross-sectional surface of the plate material is in a generally U shape, and is pivotally supported on a lateral side of the rear gate 224. As FIG. 28 illustrates, the retaining member 244 has a pair of leg portions 244A and 244B and a connecting portion 244C connecting the leg portions 244A and 244B. The retaining member 244 is fixed on the lateral side of the rear gate 224 by a bolt 244H via a through hole formed on the leg portion 244A on the inner side, but can be manually operated to swing.

The retaining member 244 can be operated to swing between a locked position and an unlocked position. At the locked position, as illustrated in FIG. 29 and in FIG. 27(b) by a solid line, the retaining member 244 is engaged in a form being externally fitted to the detachment shaft portion 242B of the shaft member 242 via a cutout 244V formed on the leg portion 244B on the outer side. At the unlocked position, as illustrated in FIG. 27(b) by a two-dot chain line, the retaining member 244 is released from the position of the detachment shaft portion 242B. At the locked position, the connecting portion 244C of the retaining member 244 is in a state parallel to and substantially on a same surface as the inner surface of the rear gate 224, or is in a state parallel to and slightly below the inner surface of the rear gate 224.

As FIG. 29 illustrates, in the usual state in which the first hole portion 240B1 of the gate hanger 240 is externally fitted to the engagement shaft portion 242C of the shaft member 242, when the retaining member 244 is swung to be pressed against the shaft member 242, the cutout 244V of the retaining member 244 engages with the detachment shaft portion 242B, and the retaining member 244 is in a state being sandwiched between the lateral side of the rear gate 224 and the gate hanger 240. Thus, the gate hanger 240 can be prevented from being accidentally moved toward the detachment shaft portion 242B.

A circular-plate-shaped stopper 224B is provided in a protruding condition on the lateral side of the rear gate 224, regulating an angle of the retaining member 244 at the unlocked position with respect to the rear gate 224 to be an angle equal to or less than a predetermined angle that is less than 90 degrees (for example, 45 degrees). As FIG. 31 illustrates, a vertically long guide plate portion 229C (an example of a sliding operation unit) extends in the width direction of the vehicle from a vertically oriented side of the cutout portion 232B of the inner end body 229 that constitutes the rear end member 227 (see also FIGS. 20 and 21).

Figure 30A:
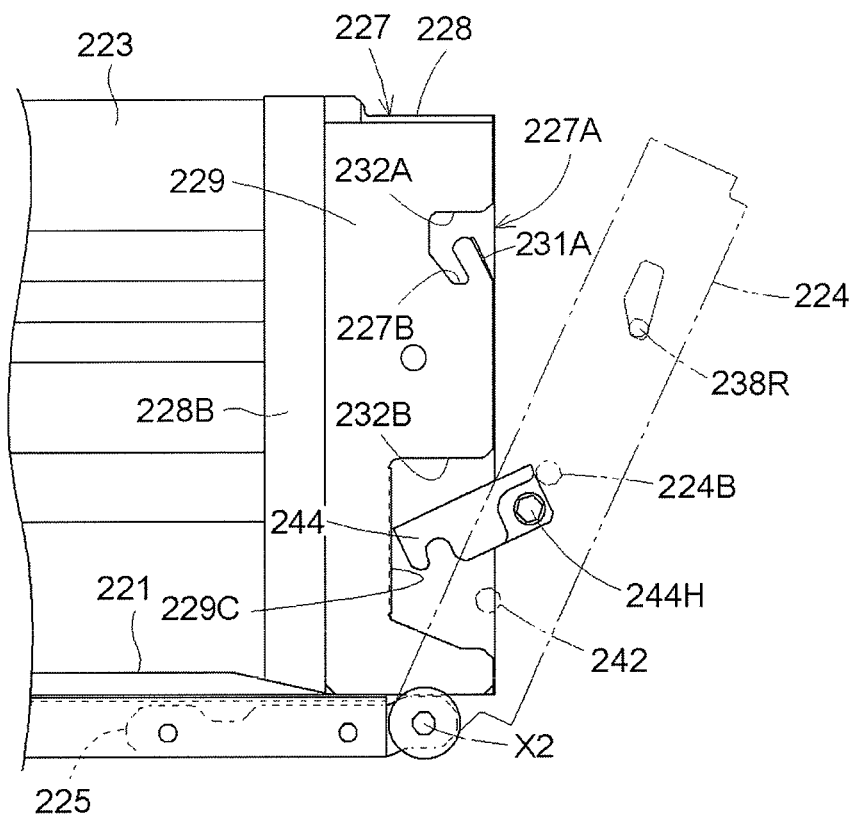
FIGS. 30($a$) and 30($b$) are side views illustrating a movement of the retaining member.
Figure 30B:
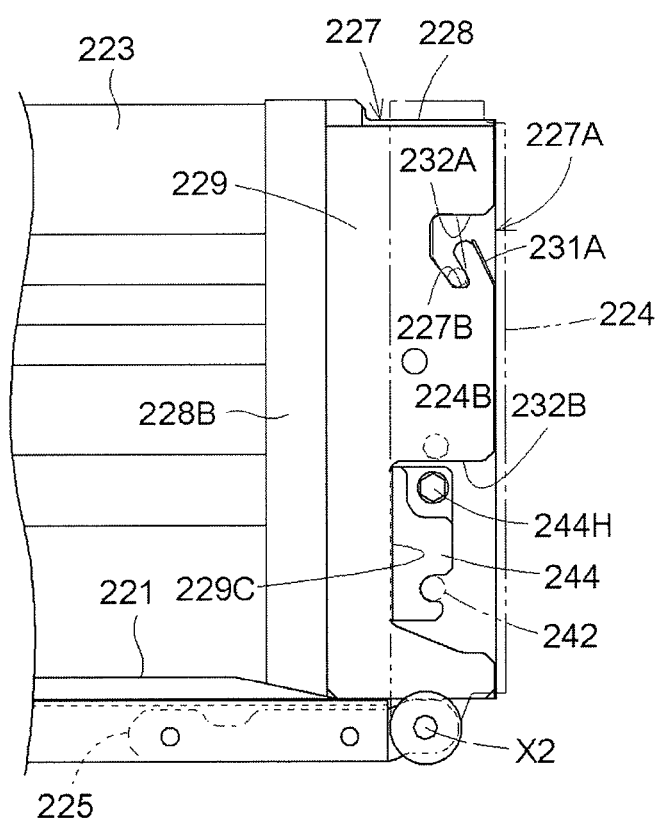

Suppose, as FIG. 30(a) illustrates, the retaining member 244 is in the unlocked position in contact with the stopper 224B, when the rear gate 224 is swingably operated from the opened position toward the closed position, a front end portion of the retaining member 244 automatically begins to be in contact with the guide plate portion 229C and is operated to move downward by the guide plate portion 229C. Thereby, as FIG. 30(b) illustrates, the retaining member 244 is forcibly operated to the locked position.

Figure 31A:
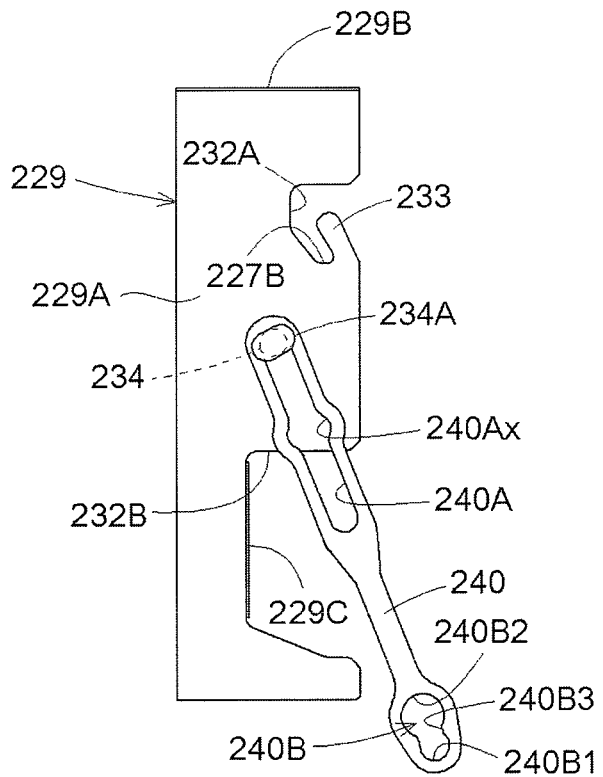
FIGS. 31($a$) and 31($b$) are side views illustrating a gate hanger of the hanging mechanism.
Figure 31B:
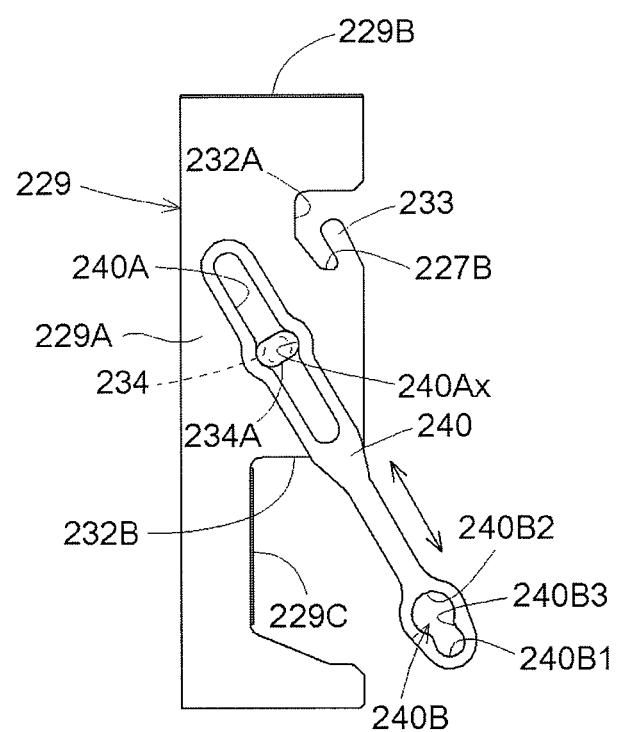

As FIGS. 31(a) and 31(b) illustrate, a retainer head 234A is provided on a front end of the pivot pin 234 to prevent the pivot pin 234 from being accidentally disengaged with the long hole 240A of the gate hanger 240. In order to allow mounting of the gate hanger 240 to the pivot pin 234 after an assembly of the rear gate 224 has been completed, the retainer head 234A has an elongated oval shape, and a widened portion 240AX wider than a major axis of the retainer head 234A is formed on a portion of the long hole 240A formed on the gate hanger 240. The mounting of the gate hanger 240 to the pivot pin 234 is performed using the cutout portion 230B formed on the rear end member 227.

(Configuration of Stopper Body)

Figure 35:
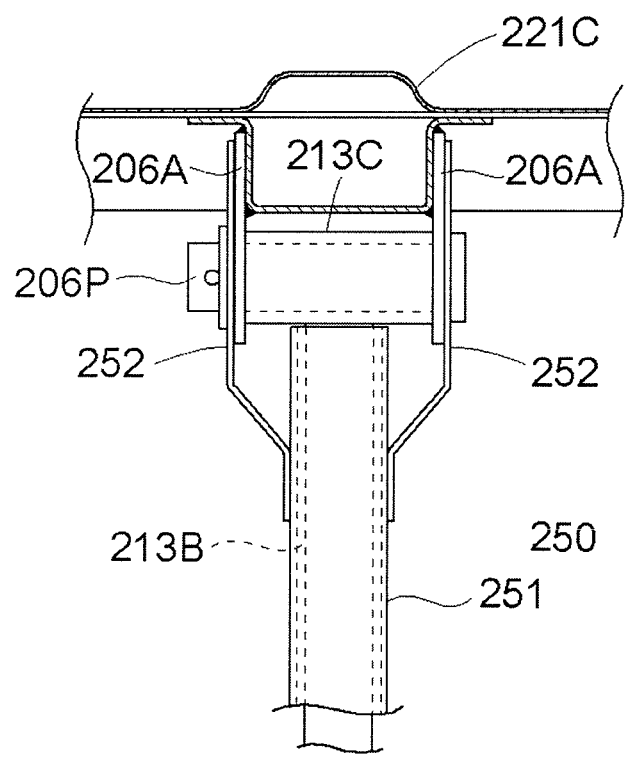
FIG. 35 is a rear view illustrating the cargo bed, a piston member, and the stopper body.

As FIG. 32 illustrates, the dump cylinder 213 vertically moving the front side of the cargo bed 206 has a cylinder member 213A pivotally supported on the vehicle body frame F side. A front end portion of a piston member 213B is pivotally supported on an underside of the cargo bed 206, the piston member 213B being telescopically supported by the cylinder member 213A. As FIG. 35 illustrates, a connecting tubular body 213C fixed on the front end of the piston member 213B is interposed between a pair of brackets 206A formed on the underside of the cargo bed 206. A pin member 206P in a lateral orientation is inserted into through holes of the brackets 206A and the connecting tubular body 213C at the same time. Thereby, the piston member 213B is pivotally supported on the underside of the cargo bed 206.

A pressure resistant hose (not illustrated in the drawings) extending from a hydraulic pump (not illustrated in the drawings) driven by the engine E is connected to the cylinder member 213A as an oil passage for telescopically operating the piston member 213B. Oil supply to and oil discharge from a cylinder chamber is controlled by a dump control valve (not illustrated in the drawings) interposed between the hydraulic pump and the cylinder chamber. Here, a lower end portion of the cylinder member 213A is pivotally supported by support brackets 220, which extend to the inside from a rear end vicinity of the main frame 214 on the right side (see also FIG. 18).

Figure 34A:
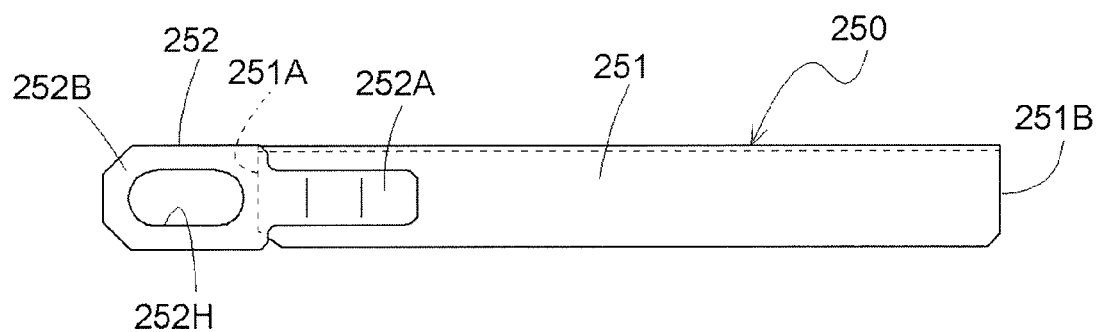
FIGS. 34($a$) and 34($b$) are a side view and a plan view illustrating a stopper body.
Figure 34B:
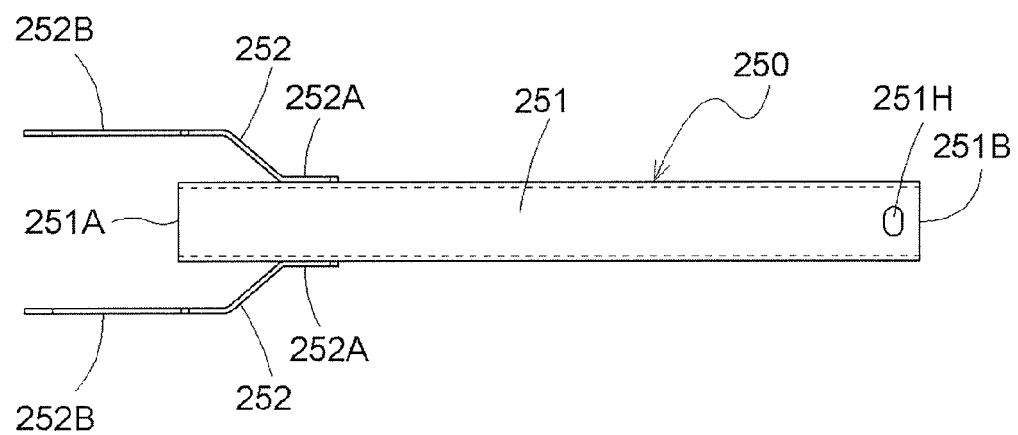

A stopper body 250 is provided on the underside of the cargo bed 206, preventing falling of the cargo bed 206 arranged at a raised position by the dump cylinder 213. As FIGS. 34(a) and 34(b) illustrate, the stopper body 250 has a long stopper main body 251 configured with a channel material, and a pair of left and right brackets 252 mounted on an upper end vicinity of the stopper main body 251.

Each of the brackets 252 includes a base end portion 252A fixed by welding on a lateral side of the stopper main body 251 and a supported portion 252B extending upward from the base end portion 252A. A long hole 252H extending in a longitudinal direction of the stopper main body 251 is formed on each of the left and right supported portions 252B. As FIG. 35 illustrates, the stopper body 250 is swingably supported about a laterally oriented axis in a state in which the pair of brackets 252 sandwich the pair of brackets 206A of the cargo bed 206 from the left and right outsides, and the pin member 206P is inserted through the connecting tubular body 213C of the piston member 213B, the pair of brackets 206A of the cargo bed 206, and the pair of brackets 252 (long holes 252H) of the stopper body 250 at the same time.

As FIG. 32 illustrates, the stopper body 250 is arranged in a state in which the channel material constituting the stopper main body 251 is positioned above the piston member 213B, and, in response to the extension of the piston member 213B, at least a portion of the piston member 213B can enter into a recess portion of a cross section of the channel material. Further, the brackets 252 are provided at portions near an upper end surface 251A of the stopper main body 251. The stopper main body 251 is swingably supported in the state in which the pin member 206P is inserted through the long holes 252H.

As FIG. 32 illustrates, when the stopper body 250 is not used as a device preventing falling of the cargo bed 206, in principle, the stopper body 250 is held by an engagement mechanism provided between the stopper body 250 and the underside of the cargo bed 206, at a retracted position at which a lower end surface 251B side of the stopper main body 251 is brought close to the underside of the cargo bed 206. The engagement mechanism has an engagement hook 255 mounted on the underside of the cargo bed 206 and a through hole 251H formed near the lower end surface 251B of the stopper main body 251. The engagement hook 255 has a base end portion 255A extending downward from the underside of the cargo bed 206, an arm portion 255B extending forward from a lower end of the base end portion 255A, and a hook portion 255C extending upward from a front end of the arm portion 255B.

When the stopper body 250 is moved to the retracted position, the lower end surface 251B vicinity of the stopper main body 251 is raised closer to the underside of the cargo bed 206, and, by using the flexibility of the long holes 252H, the stopper body 250 is temporarily moved forward until the lower end surface 251B reaches a position on a more front side than the hook portion 255C. Next, while inserting the lower end side of the stopper main body 251 rearward from a gap between the underside of the cargo bed 206 and the hook portion 255C, the hook portion 255C is inserted through the through hole 251H.

Figure 33:
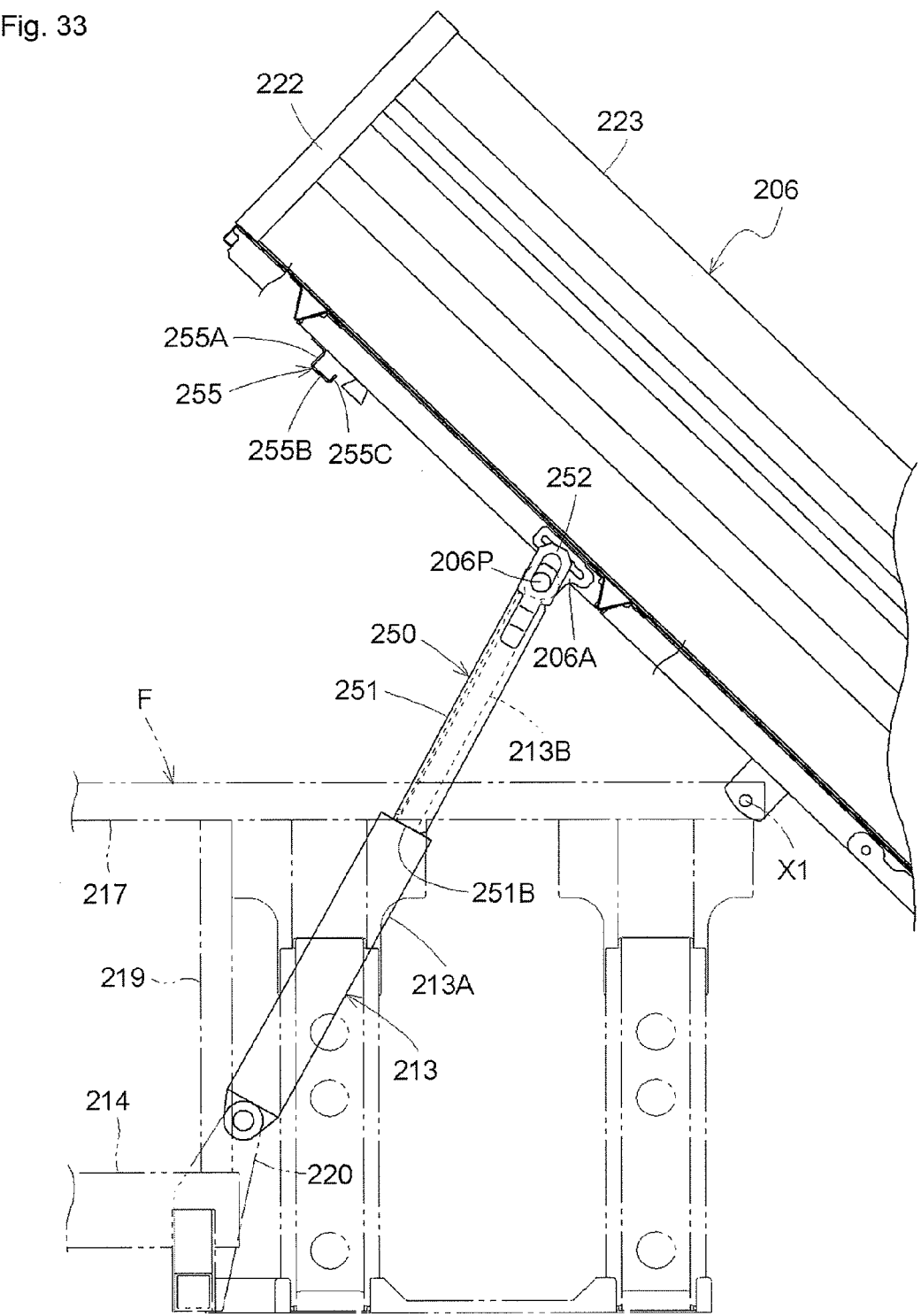
FIG. 33 is a side view illustrating the vicinity of the dump cylinder of the cargo bed (at a raised position)

When the stopper body 250 is used as a device preventing the cargo bed 206 from falling, in a state in which the cargo bed 206 is raised to a maximum angle by the dump cylinder 213, by slightly lifting the lower end side of the stopper main body 251 and moving the stopper body 250 rearward, the lower end side of the stopper main body 251 is disengaged from the engagement hook 255, and the stopper body 250 is in a state swingably operable about the pin member 206P. Then, as FIG. 33 illustrates, the lower end side of the stopper main body 251 is pulled down, and, while adjusting the position of the stopper body 250 along the piston member 213B by using the flexibility based on the long holes 252H, the stopper main body 251 is brought close to the piston member 213B until the channel material constituting the stopper main body 251 wraps around the piston member 213B. In this case, the lower end surface 251B of the stopper main body 251 is in contact with an outer peripheral surface of the piston member 213B and is in a state facing the upper end surface of the cylinder member 213A.

From this state, when the cargo bed 206 starts to fall, the U-shaped upper end surface 251A of the stopper main body 251 receives the outer peripheral surface of the connecting tubular body 213C of the piston member 213B, and the U-shaped lower end surface 251B of the stopper main body 251 receives the upper end surface of the cylinder member 213A (the end surface of the cylinder member 213A on the side facing the connecting tubular body 213C). In such a state, prevention of falling of the cargo bed 206 is realized.

As described above, while the stopper body 250 is used as a device preventing the cargo bed 206 from falling, the pin member 206P is spaced apart from both of the two ends of the long holes 252H of the brackets 252. Therefore, the load of the cargo bed 206 is supported by only the stopper main body 251 of the stopper body 250. The brackets 252 are not involved in supporting the load of the cargo bed 206.

(Configuration of Front End Vicinity of Cargo Bed)

As FIGS. 19, 36, 37(a) and 37(b) illustrate, squared-pipe-shaped front end members 226 extending in the vertical direction are fixed by welding on front ends of the left and right side panels 223 of the cargo bed 206. As FIG. 37(b) illustrates, each of the front end members 226 is formed by bending a steel plate, and has a square pipe portion 226A, which has a generally square cross section in a plan view, and a plate-shaped extension portion 226B, which extends inward from a front end of a portion that constitutes an inner side of the square pipe portion 226A.

The front end members 226 are fixed by welding to the front ends of the side panels 223 via rear end surfaces of the square pipe portions 226A. Further, the front end members 226 are fixed by welding to the front panel 222 via front end portions of the extension portions 226B in a state in which the extension portions 226B of the front end members 226 overlap a front configuration plate portion 222A of the front panel 222 from the front side.

On a lower end of the front configuration plate portion 222A of the front panel 222, a drainage flow passage 260 is formed draining rainwater and the like accumulated on the floor panel 221 of the cargo bed 206. The lower end of the front configuration plate portion 222A extends sufficiently below the underside of the floor panel 221, and has a first horizontal portion 222B extending rearward from the lower end, a first vertical portion 222C extending upward from a rear end of the first horizontal portion 222B, and a second horizontal portion 222D extending rearward from an upper end of the first vertical portion 222C.

Figure 36:
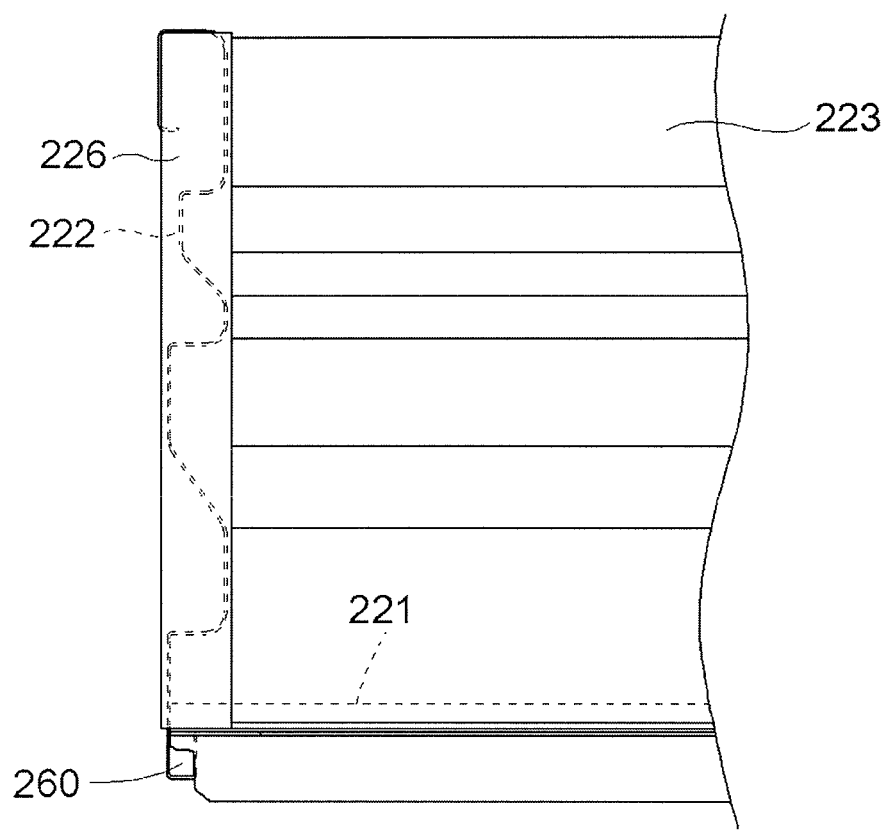
FIG. 36 is a side view illustrating a vicinity of a front end portion of the cargo bed.

As FIG. 36 illustrates, the second horizontal portion 222D is fixed by welding to the underside of the floor panel 221. The drainage flow passage 260 is formed by the first horizontal portion 222B, the lower end vicinity of the front configuration plate portion 222A, and the first vertical portion 222C. The first horizontal portion 222B constitutes a bottom portion of the drainage flow passage 260. The lower end vicinity of the front configuration plate portion 222A and the first vertical portion 222C face each other in the longitudinal direction and constitute lateral walls of the drainage flow passage 260. Rainwater and the like accumulated on the floor panel 221 of the cargo bed 206 flows into the first horizontal portion 222B via longitudinally oriented grooves formed on the floor panel 221, and is drained to lateral outsides from the drainage flow passage 260.

In addition to the above-described embodiments, the present invention may also be configured as follows.

Figure 14:
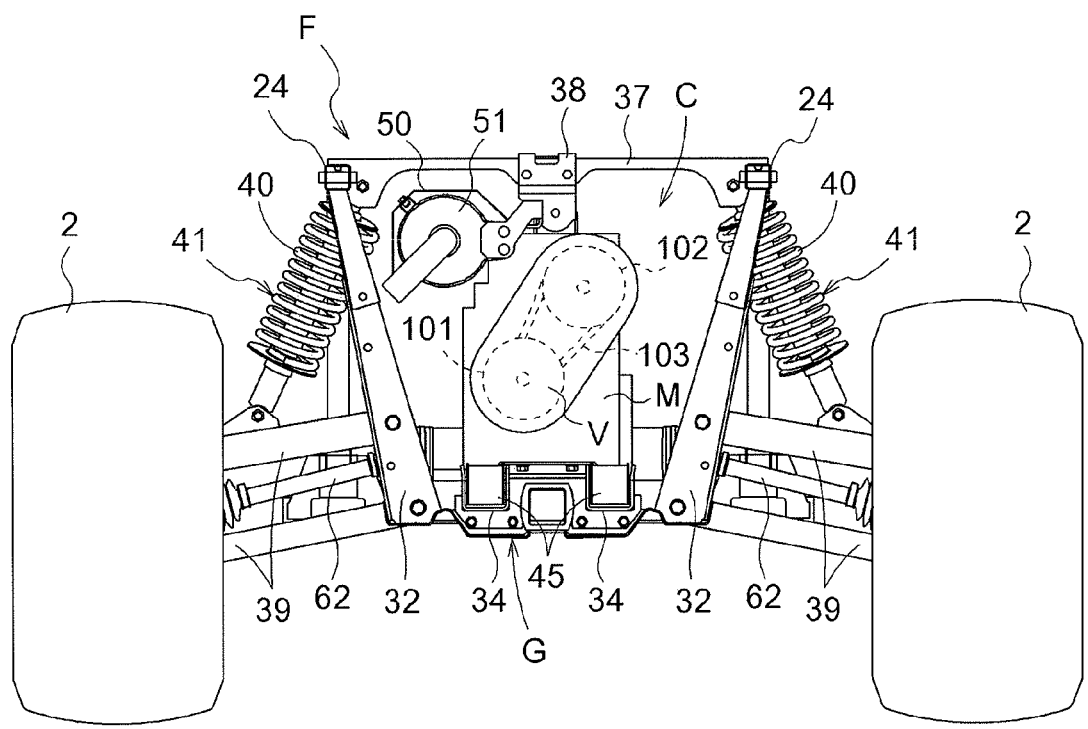
FIG. 14 is a rear view illustrating a configuration of another embodiment (a)

(a) As FIG. 14 illustrates, by providing a driving side pulley 101 capable of adjusting a belt winding radius, a driven side pulley 102, and an endless belt 103 wound around the driving side pulley 101 and the driven side pulley 102, a belt CVT type continuously variable transmission V is configured. In FIG. 14, the driven side pulley 102 is arranged at an upper position. The orientation of the continuously variable transmission V is configured in such a manner that the upper position is displaced toward one side. The muffler 51 is arranged on the other side of the upper position. Also in the configuration of the other embodiment (a), a protector 57 protecting the continuously variable transmission V may be detachably provided.

As described above, as compared to a hydrostatic continuously variable transmission V, in the continuously variable transmission V using a belt, a driving force is transmitted via the belt, and thus, transmission efficiency can be increased. Further, in the configuration in which the protector 57 is provided, the rear side of the continuously variable transmission V can be protected.

(b) As the continuously variable transmission V, in addition to configurations of a hydrostatic type and a belt CVT type, any configuration of a toroidal CVT may be adopted.

(c) A speed change unit is configured by a transmission case M. The transmission case M may be provided in an inclined orientation when viewed in the longitudinal direction. Even when the orientation of the transmission case M is configured as described above, the muffler 51 can be arranged in a space formed on a lateral side of an upper portion of the transmission case M.

(d) It is also possible to carry out the present invention in such a mode in which the pivot pins 234 are provided on the lateral sides of the rear gate 224; the gate hangers 240 are pivotally supported by the pivot pins 234 of the rear gate 224 via the long holes 240A; and the shaft members 242 that engage and disengage the long holes 240A are arranged projecting laterally inward from inner surfaces of the side panels 223. In this case, the retaining members 244 may be preferably pivotally supported on the rear gate 224.

(e) It is also possible to carry out the present invention in such a mode in which the arrangements of the detachment shaft portion 242B and the engagement shaft portion 242C that constitute the shaft member 242 are reversed; the engagement shaft portion 242C extends from the front end side of the base end portion 242A that is fixed on the lateral side of each of the left and right side panels 223; the detachment shaft portion 242B having a smaller diameter extends from the front end side of the engagement shaft portion 242C; and the retainer head 242D extends from the front end side of the detachment shaft portion 242B.

INDUSTRIAL APPLICABILITY

The present invention is applicable to a working vehicle in which a muffler is provided at a rear position of a vehicle body.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A working vehicle comprising:
a speed change unit arranged at a rear position of a traveling vehicle body;
a housing of the speed change unit being inclined to one side in a lateral direction of the traveling vehicle body so as to provide a greater lateral space on one lateral side of the speed change unit and a lesser lateral space on an opposite lateral side of the speed change unit;
a muffler arranged in the greater lateral space;
the speed change unit being a continuously variable transmission connected to a rear end portion of a transmission case;
a transmission system is configured in which a driving force controlled by the continuously variable transmission is transmitted to the transmission case, and is transmitted from the transmission case to left and right rear wheels via left and right rear wheel drive shafts;
the continuously variable transmission is configured and arranged in an inclined manner such that an upper position of the continuously variable transmission protrudes above an upper surface of the transmission case, and is displaced, more than a lower position of the continuously variable transmission, toward the one side in the lateral direction of the vehicle body;
the muffler is arranged on the other side in the lateral direction of the vehicle body with respect to the upper position of the continuously variable transmission, and at a position above the rear wheel drive shafts;
the transmission case is connected to a rear portion of an engine;
a drive shaft for driving front wheels is arranged in a longitudinal orientation facing forward from a lower portion of the transmission case;
the engine is arranged at a position displaced from a center in the lateral direction of the vehicle body to the other side in the lateral direction of the vehicle body; and
the drive shaft is displaced from the center in the lateral direction of the vehicle body to the one side in the lateral direction of the vehicle body.

2. The working vehicle according to claim 1, wherein the continuously variable transmission is provided with a variable capacity type hydraulic pump and a hydraulic motor actuated by hydraulic oil supplied from the hydraulic pump, and
an oil filter filtering the hydraulic oil is provided on a lateral side of the continuously variable transmission.

3. The working vehicle according to claim 1, wherein a protector protecting the continuously variable transmission is detachably provided at a rear position of the continuously variable transmission.

4. The working vehicle according to claim 1, wherein the continuously variable transmission comprises:
a driving side pulley capable of adjusting a belt winding radius;
a driven side pulley; and
an endless belt wound around the driving side pulley and the driven pulley.

5. The working vehicle according to claim 1, wherein the speed change unit is a hydrostatic continuously variable transmission.

6. The working vehicle according to claim 1, further comprising:
a cargo bed arranged at the rear position of the travelling vehicle body; and
a dump cylinder arranged in the lesser lateral space.

7. A working vehicle comprising:
a transmission case having lateral sides and a rear side;
a variable transmission connected to the rear side of the transmission case and being arranged at a rear position of a traveling vehicle body;
a vehicle body frame of the traveling vehicle body comprises:
a pair of left and right upper frames extending in a longitudinal direction;
up and down oriented frames arranged in an inclined orientation such that upper ends of the up and down oriented frames are connected to the left and right upper frames, and lower ends of the up and down oriented frames are displaced toward an inner side of the traveling vehicle body with respect to the upper ends; and
an underframe connected to the lower ends of the up and down oriented frames,
thereby, an inverted trapezoid is formed with an imaginary line connecting the upper ends of the up and down oriented frames on left and right sides as an upper base, and an imaginary line connecting the lower ends of the up and down oriented frames on the left and right sides as a lower base,
the variable transmission being arranged inside a space forming the inverted trapezoid, and
a muffler, oriented along a front and back direction of the vehicle body frame, is arranged inside the space and in a vicinity of one of upper left and right corners of the inverted trapezoid.

8. The working vehicle according to claim 7, wherein base ends of suspension arms are supported on the up and down oriented frames in a manner vertically swingable about longitudinally oriented swing axes,
rear wheels are rotatably supported on swing ends of the suspension arms, and upper ends of suspension units that are compressed when the suspension arms swing upward are supported on the upper frames or on members in vicinities of the upper frames.

9. The working vehicle according to claim 8 comprising:
a mount frame as the underframe, wherein,
the mount frame is configured to have a dimension in a width direction of the vehicle body shorter than a distance between the left and right upper frames in the width direction of the vehicle body,
a drive unit transmitting a driving force to the rear wheels is supported on the mount frame, and
the muffler is supported on the drive unit.

10. The working vehicle according to claim 9, wherein
a lateral frame is provided connecting the left and right upper frames,
an upper portion of the drive unit is supported by the lateral frame, and
the muffler is arranged in a vicinity of a lower side of the lateral frame.

11. The working vehicle according to claim 7, wherein the variable transmission is a continuously variable transmission (CVT).

12. The working vehicle according to claim 7, wherein the variable transmission is a hydrostatic continuously variable transmission.

13. The working vehicle according to claim 7, further comprising:
a cargo bed arranged at the rear position of the travelling vehicle body; and
a dump cylinder arranged inside the space and in a vicinity of another of the upper left and right corners of the inverted trapezoid.

14. A working vehicle comprising:
a transmission and a speed change unit arranged at a rear position of a traveling vehicle body;
a housing of the speed change unit arranged between inclined and up and down oriented first and second frame members;
the housing being inclined laterally toward the second frame member such that an upper end of the housing is closer to the second frame member than to the first frame member;
a first lateral space being defined by the first frame member and the housing;
a second lateral space being defined by the second frame member and the housing;
the first lateral space being greater than the second lateral space and being sized to accommodate a muffler; and
a muffler oriented along a front and back direction of the traveling vehicle body and being arranged in the first lateral space.

15. The working vehicle according to claim 14, further comprising:
a cargo bed arranged at the rear position of the travelling vehicle body; and
a dump cylinder arranged in the second lateral space.

16. The working vehicle according to claim 14, further comprising:
upper and lower rear suspension arms connected to the first frame member; and
upper and lower rear suspension arms connected to the second frame member.

* * * * *